US010766572B2

(12) United States Patent
Pard et al.

(10) Patent No.: US 10,766,572 B2
(45) Date of Patent: Sep. 8, 2020

(54) TOE HOLD FOR A SNOWMOBILE

(71) Applicant: BOMBARDIER RECREATIONAL PRODUCTS INC., Valcourt (CA)

(72) Inventors: Jean-Sebastien Pard, Tingwick (CA); Yvon Bedard, Orford (CA); Martin Gagnon, Valcourt (CA); Mathieu Mercier, Sherbrooke (CA); Christian Labbe, Bromont (CA); Sebastien Vezina, Sherbrooke (CA)

(73) Assignee: BOMBARDIER RECREATIONAL PRODUCTS INC., Valcourt (CA)

(*) Notice: Subject to any disclaimer, the term of this patent is extended or adjusted under 35 U.S.C. 154(b) by 231 days.

(21) Appl. No.: 15/577,465

(22) PCT Filed: May 30, 2016

(86) PCT No.: PCT/IB2016/053183
§ 371 (c)(1),
(2) Date: Nov. 28, 2017

(87) PCT Pub. No.: WO2016/193901
PCT Pub. Date: Dec. 8, 2016

(65) Prior Publication Data
US 2018/0141616 A1 May 24, 2018

Related U.S. Application Data

(60) Provisional application No. 62/298,095, filed on Feb. 22, 2016, provisional application No. 62/168,239, filed on May 29, 2015.

(51) Int. Cl.
B62M 27/02 (2006.01)
B62D 55/07 (2006.01)
B62M 9/00 (2006.01)

(52) U.S. Cl.
CPC ............. B62M 27/02 (2013.01); B62D 55/07 (2013.01); B62M 9/00 (2013.01); B60Y 2200/252 (2013.01); B62M 2027/028 (2013.01)

(58) Field of Classification Search
CPC .. B62M 27/02; B62M 9/00; B62M 2027/028; B60Y 2200/252
See application file for complete search history.

(56) References Cited

U.S. PATENT DOCUMENTS 6,446,744 B2  9/2002  Wubbolts et al.
6,758,497 B2  7/2004  Bergman
(Continued)

FOREIGN PATENT DOCUMENTS

RU    2517918 C2    6/2014

OTHER PUBLICATIONS

International Search Report of PCT/IB2016/053183; Blaine R. Copenheaver; dated Sep. 19, 2016.
(Continued)

Primary Examiner — Jacob D Knutson
Assistant Examiner — Marlon A Arce
(74) Attorney, Agent, or Firm — BCF LLP

(57) ABSTRACT

A snowmobile includes a frame, a motor, an endless track and a straddle seat. A left and a right footrest are each connected to the frame extend laterally outwardly therefrom. The footrests extend generally horizontally and are disposed vertically lower than the straddle seat for supporting a left foot of the driver. The left footrest is disposed on a left side of the snowmobile and the right footrest is disposed on a right side thereof. A left toe hold disposed above the left footrest is supported at an inner portion thereof and extends laterally outwardly therefrom to an outer portion thereof, the outer portion of the left toe hold being freely suspended. A (Continued)

right toe hold disposed above the right footrest is supported at an inner portion thereof and extending laterally outwardly therefrom to an outer portion thereof, the outer portion of the right toe hold being freely suspended.

35 Claims, 29 Drawing Sheets

(56) References Cited

U.S. PATENT DOCUMENTS

| | | | |
|---|---|---|---|
| 7,080,706 B2 * | 7/2006 | Vaisanen | B62J 25/00 |
| | | | 180/190 |
| 7,708,096 B2 | 5/2010 | Vezina | |
| 8,381,857 B1 | 2/2013 | Sampson et al. | |
| 9,346,508 B1 | 5/2016 | Lemieux | |
| 2003/0201128 A1 | 10/2003 | Girouard et al. | |
| 2005/0126839 A1 * | 6/2005 | Rasidescu | B62M 27/02 |
| | | | 180/190 |
| 2011/0192667 A1 | 8/2011 | Conn et al. | |
| 2018/0237106 A1 * | 8/2018 | Hedlund | B62M 27/02 |

OTHER PUBLICATIONS

Decision to Grant Patent issued by the ROSPATENT dated Oct. 21, 2019 in connection with corresponsing Russian patent application No. 2017144865 and including Search Report.
English translation of RU2517918C2 retrieved from http://translationportal.epo.org/ on Jan. 16, 2020.

* cited by examiner

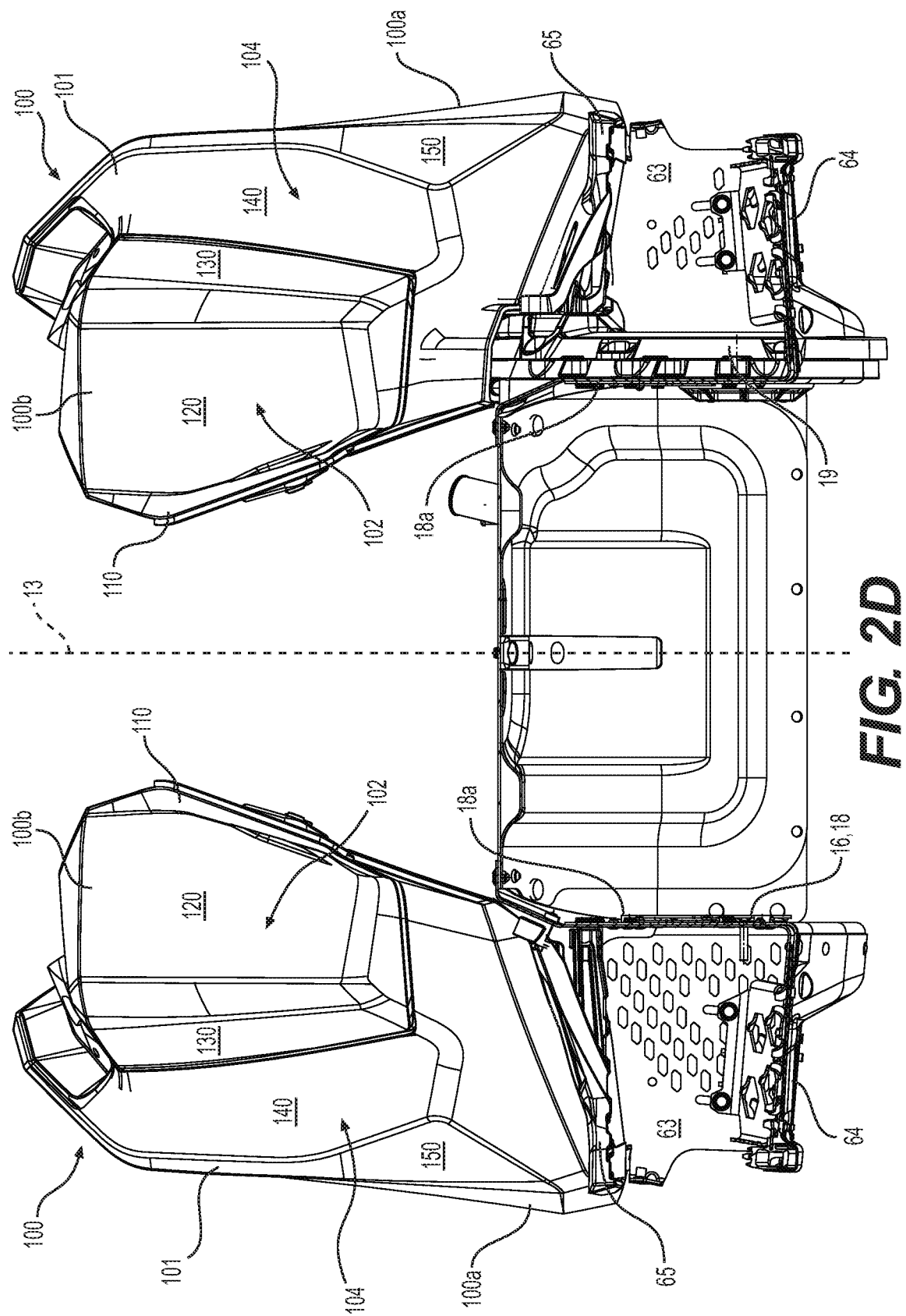

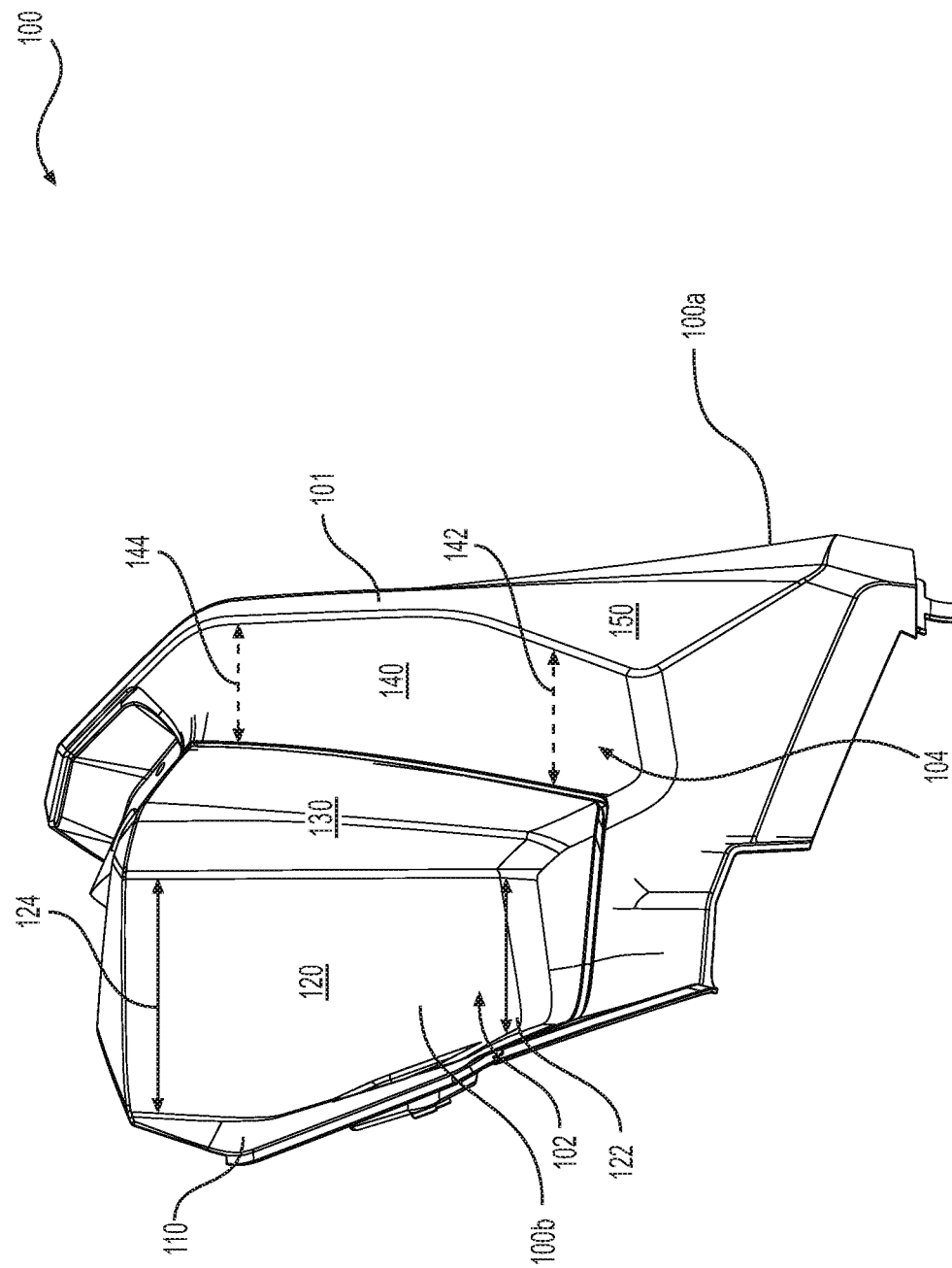

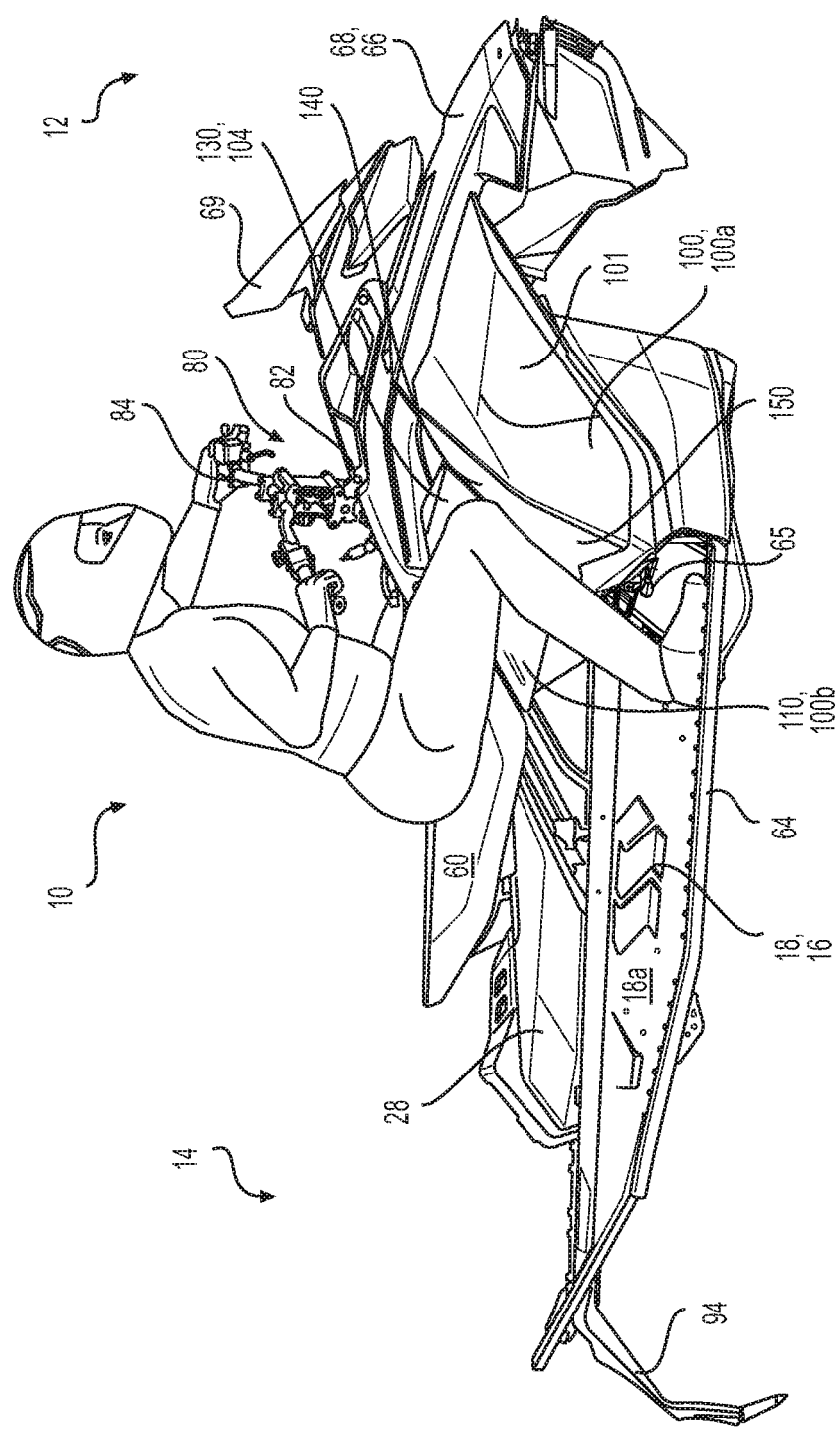

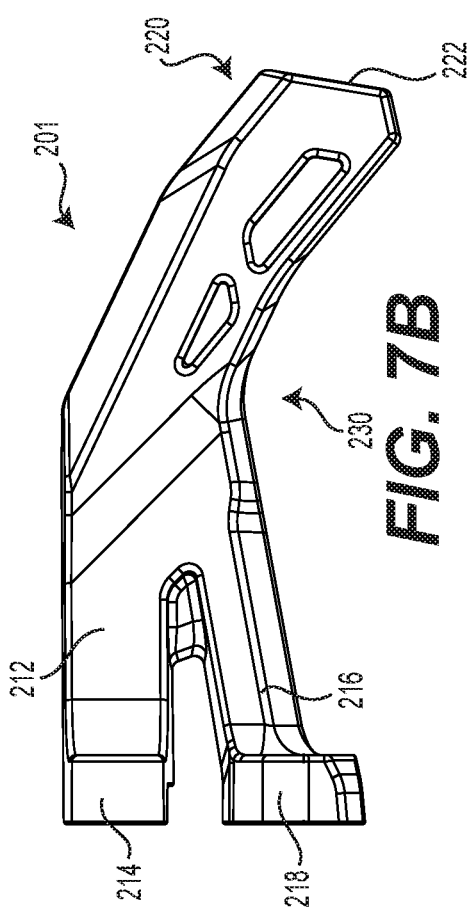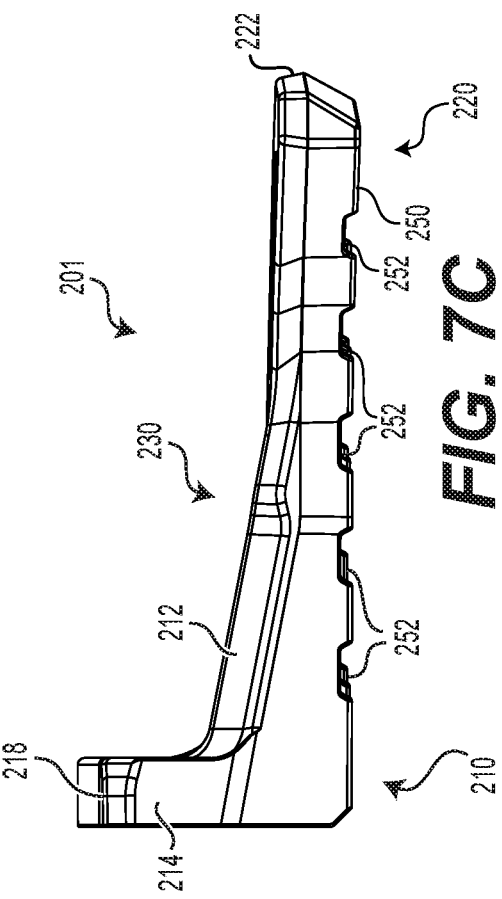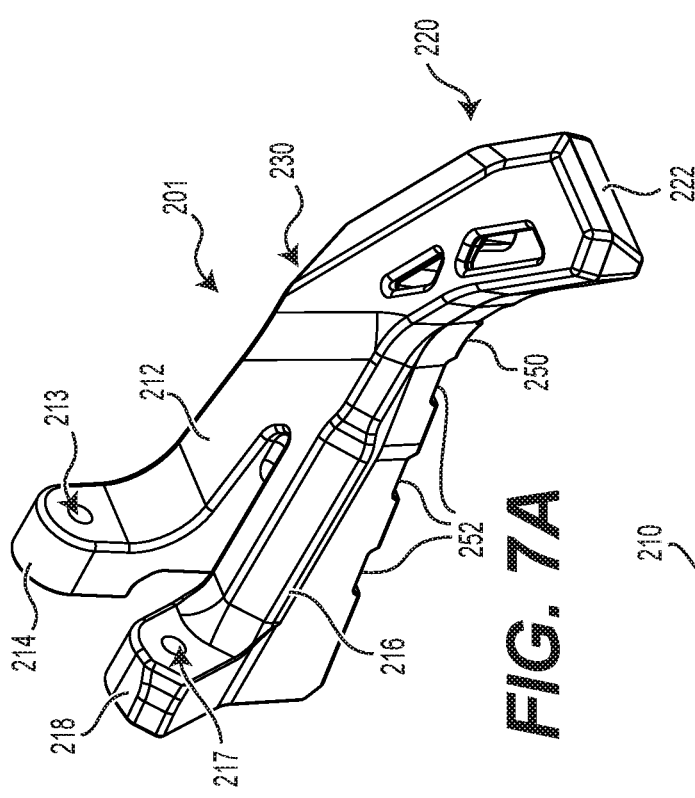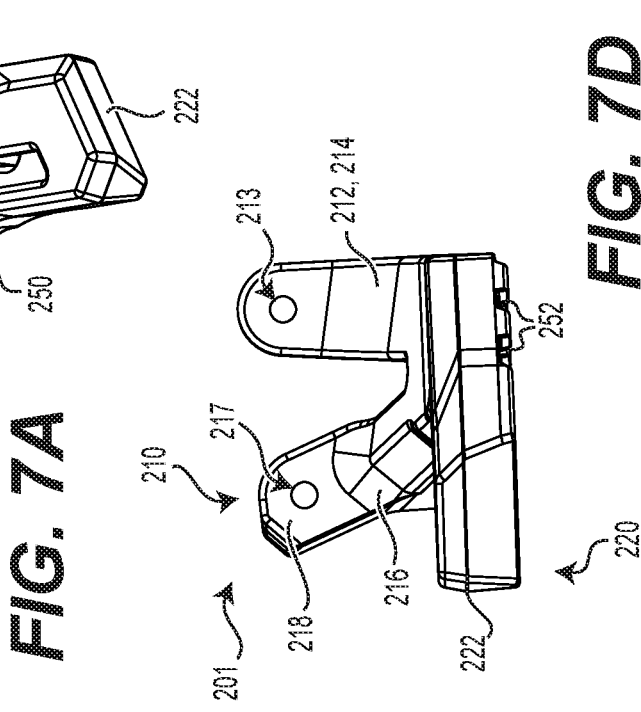

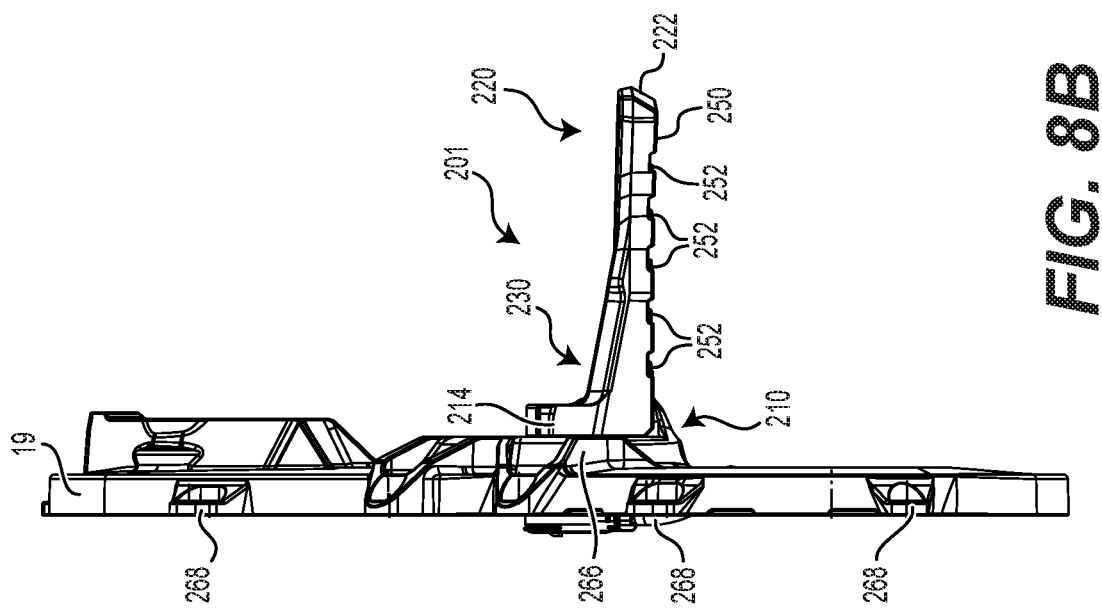
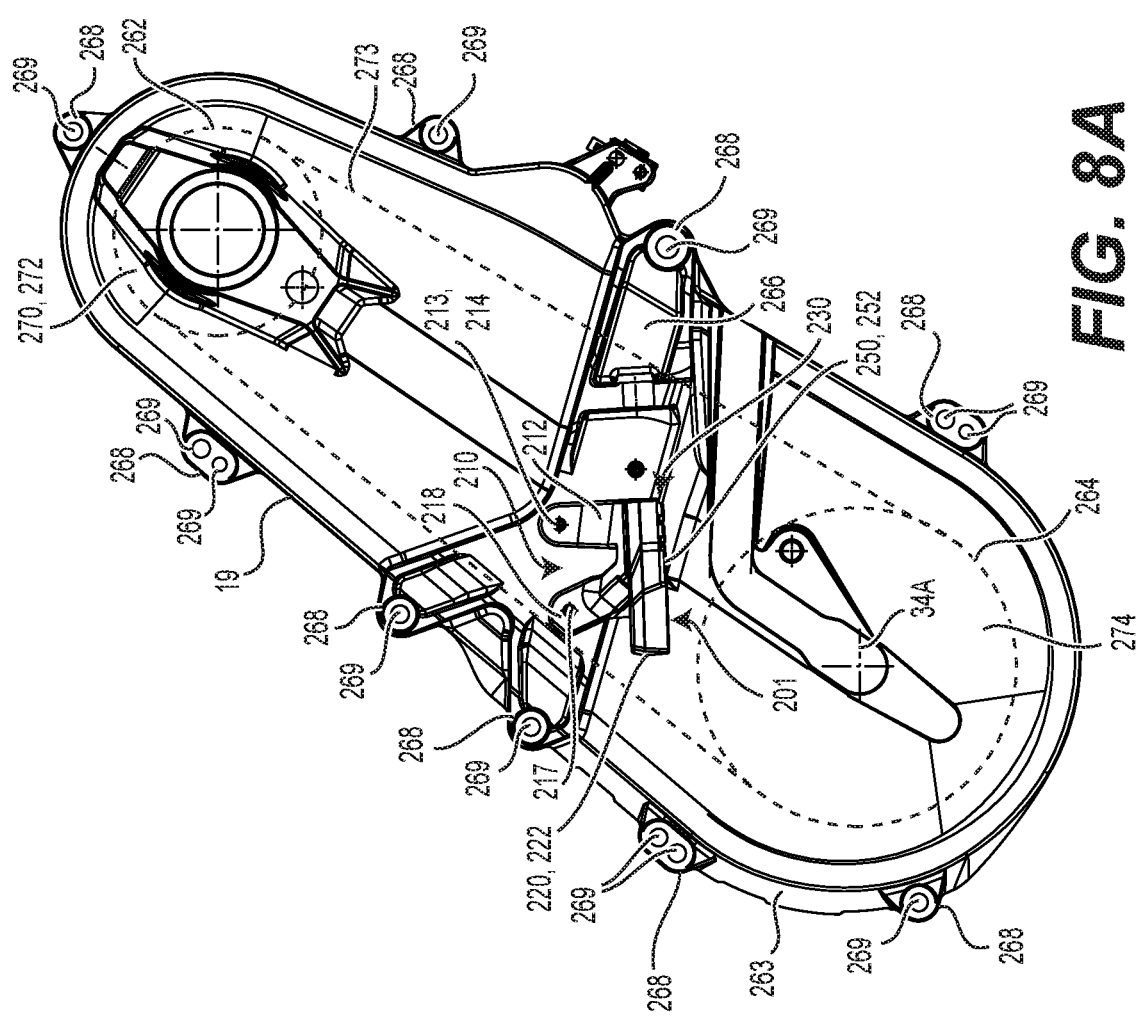

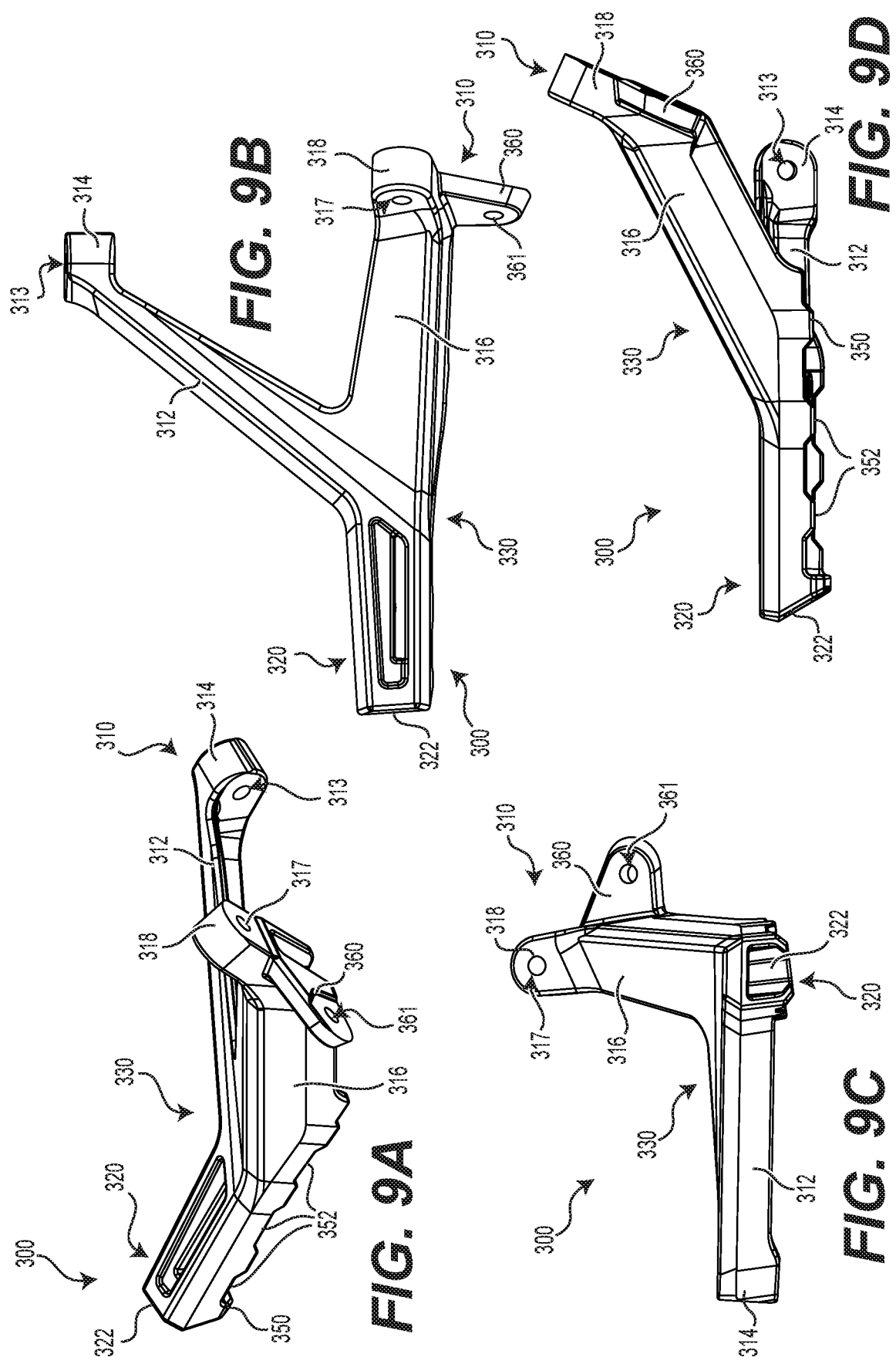

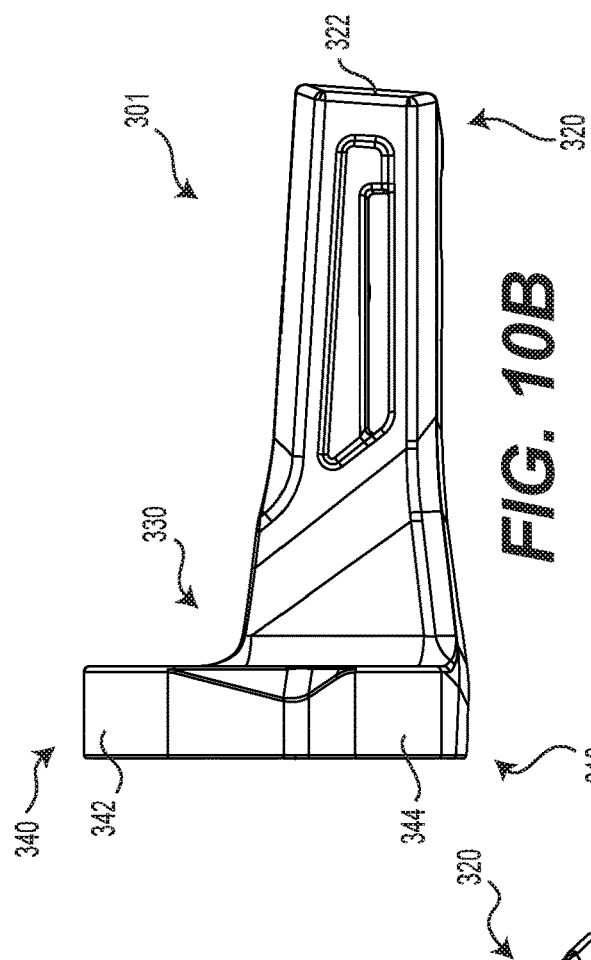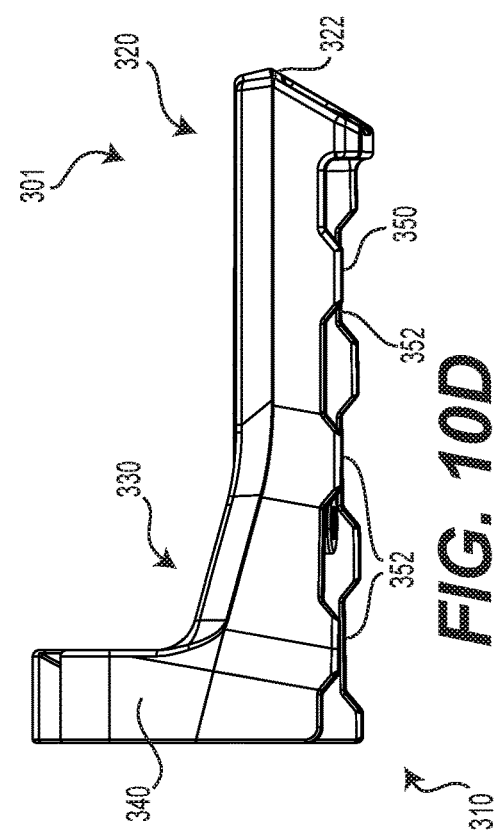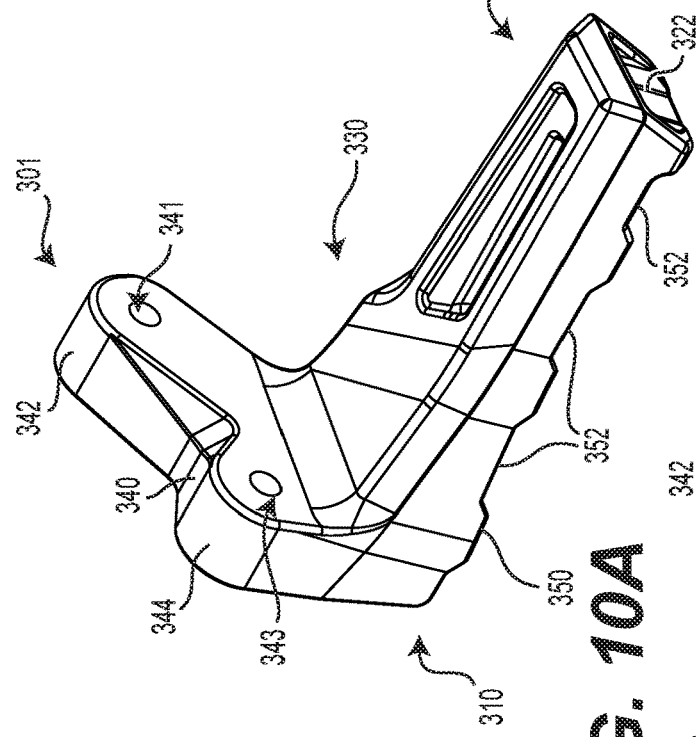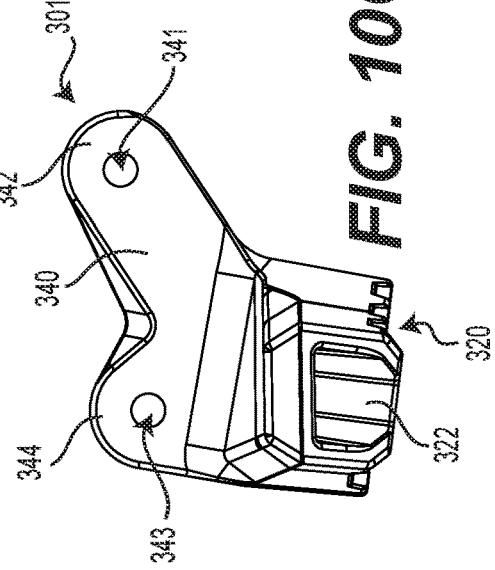

TOE HOLD FOR A SNOWMOBILE

CROSS-REFERENCE

The present application claims priority to U.S. Provisional Patent Application No. 62/298,095 filed on Feb. 22, 2016 and U.S. Provisional Patent Application No. 62/168,239 filed on May 29, 2015, the entirety of both of which is incorporated herein by reference. The present application is also related to U.S. Pat. No. 9,346,508 issued on May 24, 2016, U.S. Provisional Patent Application No. 61/944,230 filed on Feb. 25, 2014, U.S. Provisional Patent Application No. 62/298,043 filed on Feb. 22, 2016, and International Patent Application No. PCT/IB2016/051812 filed on Mar. 30, 2016, the entirety of all of which is incorporated herein by reference.

TECHNICAL FIELD

The present technology relates to toe holds for snowmobiles.

BACKGROUND

When driving a straddle-seat vehicle such as a snowmobile, the driver is typically positioned upright on the seat when the vehicle is moving in a straight-ahead direction. When turning however, the driver may lean towards the inside of the turn in addition to turning the handlebar to that side. Typically, the driver leans further for executing sharper and/or faster turns than when gently turning the vehicle. It is therefore desirable, especially in high-performance and sport vehicles, to configure the vehicle such that the driver is positioned comfortably and firmly thereon both while driving in a straight-ahead orientation and when executing turns.

SUMMARY

One object of the present is to ameliorate at least some of the inconveniences of the prior art.

In accordance with one aspect of the present technology, there is provided a snowmobile including a frame defining a longitudinal centerplane of the snowmobile, a motor operatively connected to the frame, an endless track operatively connected to the motor and the frame, and a straddle seat connected to the frame and configured to accommodate a driver. A left footrest is connected to the frame and extending laterally outwardly therefrom. The left footrest extends generally horizontally and is disposed on a left side of the snowmobile vertically lower than the straddle seat for supporting a left foot of the driver. A right footrest is connected to the frame and extending laterally outwardly therefrom. The right footrest extends generally horizontally and is disposed on a right side of the snowmobile vertically lower than the straddle seat for supporting a right foot of the driver. A left toe hold is disposed above the left footrest, a portion of the left footrest extending under the left toe hold. The left toe hold is supported at an inner portion thereof and extends laterally outwardly therefrom to an outer portion thereof. The outer portion of the left toe hold is freely suspended. A right toe hold is disposed above the right footrest, a portion of the right footrest extending under the right toe hold. The right toe hold is supported at an inner portion thereof and extends laterally outwardly therefrom to an outer portion thereof. The outer portion of the right toe hold is freely suspended.

In some implementations, the left toe hold is configured to accommodate the driver's left foot selectively disposed in a first left foot position and a second left foot position and moveable therebetween, a front portion of the left foot being disposed between an outer end of the outer portion of the left toe hold and the left footrest in the second left foot position, the front portion of the left foot being disposed further laterally outwardly in the second left foot position than in the first left foot position; and the right toe hold is configured to accommodate the driver's right foot selectively disposed in a first right foot position and a second right foot position and moveable therebetween, a front portion of the right foot being disposed between an outer end of the outer portion of the right toe hold and the right footrest in the second right foot position, the front portion of the right foot being thereby disposed further laterally outwardly in the second right foot position than in the first right foot position.

In some implementations, the outer portion of each of the left and right toe holds has a lower surface facing towards the corresponding one of the left and right footrests, the lower surface having at least one groove.

In some implementations, the outer portion of each of the left and right toe holds extends rearwardly in a laterally outwardly direction.

In some implementations, an outer end of the outer portion of the left toe hold extends laterally outwardly of an outer edge of the portion of the left footrest disposed below the left toe hold and an outer end of the outer portion of the right toe hold extends laterally outwardly of an outer edge of the portion of the right footrest disposed below the right toe hold.

In some implementations, each of the left and right footrests is a footboard.

In some implementations, the inner portion of at least one of the left and right toe holds comprises a first mounting portion and a second mounting portion.

In some implementations, the first mounting portion is disposed longitudinally forward of the second mounting portion.

In some implementations, the snowmobile further comprises a reduction gear assembly operatively connecting the motor to the endless track, the reduction gear assembly being disposed on one of a right side and a left side of the longitudinal centerplane and a chaincase cover disposed over the reduction gear and connected to the frame, the inner portion of one of the left toe hold and the right toe hold being mounted to the chaincase cover, and the inner portion of an other one of the left toe hold and right toe hold being mounted to the frame.

In some implementations, the reduction gear assembly is disposed on the right side of the longitudinal centerplane, the inner portion of the left toe hold is mounted to the frame, and the inner portion of the right toe hold is mounted to the chaincase cover.

In some implementations, the snowmobile further comprises a drive axle operatively connected to the motor and the endless track for driving the endless track, the drive axle extending laterally and horizontally and defining a drive axle axis, the left and right toe holds being disposed longitudinally rearwardly of the drive axle axis.

In some implementations, the snowmobile further comprises a left side panel disposed on a left side of the snowmobile and a right side panel disposed on a right side of the snowmobile, each of the left and right side panels being connected to the frame and disposed at least in part longitudinally forward of and vertically lower than the straddle seat, and wherein the left toe hold is housed at least in part in a left foot space defined by the left side panel and the left footrest and the right toe hold is housed at least in part in a right foot space defined by the right side panel and the right footrest.

In some implementations, the snowmobile further comprises a left side panel disposed on a left side of the snowmobile and a right side panel disposed on a right side of the snowmobile, each of the left and right side panels being connected to the frame and disposed at least in part longitudinally forward of and vertically lower than the straddle seat, the left side panel extending above the left toe hold and having an outer surface defining a left leg area for accommodating a portion of a left leg of the driver and the right side panel extending above the right toe hold and having an outer surface defining a right leg area for accommodating a portion of a right leg of the driver.

In some implementations, when the snowmobile is viewed from above, a rear edge of the left side panel disposed above the left footrest is disposed rearwardly of the inner end of the left toe hold and forwardly of the outer end of the left toe hold and the rear edge of the right side panel disposed above the right footrest is disposed rearwardly of the inner end of the right toe hold and forwardly of the outer end of the right toe hold.

In some implementations, the left leg area is a rear left leg area selectively accommodating the portion of the left leg of the driver in a rear left leg position and the right leg area is a rear right leg area the rear right leg area selectively accommodating the portion of the right leg of the driver in a rear right leg position, and the snowmobile further comprises a front left leg area defined by the left side panel and disposed longitudinally forward of the rear left leg area, the front left leg area being configured to selectively accommodate the portion of the left leg of the driver in a front left leg position when the driver is leaning leftwardly and a front right leg area defined by the right side panel and disposed longitudinally forward of the rear right leg area, the front right leg area being configured to selectively accommodate the portion of the right leg of the driver in a front right leg position when the driver is leaning rightwardly.

In some implementations, the left toe hold is configured to accommodate the driver's left foot selectively disposed in a first left foot position and a second left foot position and moveable therebetween, a front portion of the left foot being disposed between an outer end of the outer portion of the left toe hold and the left footrest in the second left foot position, the front portion of the left foot being disposed further laterally outwardly in the second left foot position than in the first left foot position, the left toe hold being configured to accommodate the driver's left foot in the second left foot position when the portion of the driver's right leg is in the front right leg area and the right toe hold is configured to accommodate the driver's right foot selectively disposed in a first right foot position and a second right foot position and moveable therebetween, a front portion of the right foot being disposed between an outer end of the outer portion of the right toe hold and the right footrest in the second right foot position, the front portion of the right foot being thereby disposed further laterally outwardly in the second right foot position than in the first right foot position, the right toe hold being configured to accommodate the driver's right foot in the second right foot position when the portion of the driver's left leg is in the front left leg area.

In some implementations, the left toe hold is configured to accommodate the driver's left foot in the first left foot position when the portion of the driver's right leg is in the rear right leg area and the right toe hold is configured to accommodate the driver's right foot in the first right foot position when the portion of the driver's left leg is in the rear left leg area.

In some implementations, the snowmobile further comprises a left footstop extending upwardly above the left footrest and being disposed longitudinally forward of the left toe hold and a right footstop extending upwardly above the right footrest and being disposed longitudinally forward of the right toe hold.

In some implementations, the left footstop is connected to the left footrest and the right footstop is connected to the right footrest.

In some implementations, for each of the left and right side panels, the outer surface comprises a rear lateral surface and a front lateral surface disposed at least in part longitudinally forward of the rear lateral surface, each of the rear and front lateral surfaces extending generally laterally and vertically, and the rear left leg area is defined at least in part by the rear lateral surface of the left side panel, the front left leg area is defined at least in part by the front lateral surface of the left side panel, the rear right leg area is defined at least in part by the rear lateral surface of the right side panel and the front leg area is defined at least in part by the front lateral surface of the left side panel.

In some implementations, for each of the left and right side panels, the front lateral surface extends laterally outwardly of the rear lateral surface.

In some implementations, for each of the left and right side panels, the outer surface further comprises a longitudinal surface extending generally longitudinally and vertically, the longitudinal surface being disposed at least in part longitudinally rearward of the front lateral surface and longitudinally forward of the rear lateral surface.

In some implementations, for each of the left and right side panels, the longitudinal surface is a front longitudinal surface and further comprising a rear longitudinal surface extending generally longitudinally and vertically, the rear longitudinal surface being disposed at least in part longitudinally rearward of the rear lateral surface.

In some implementations, for each of the left and right side panels, the outer surface further comprises a front outer surface extending laterally outwardly and forwardly from the front lateral surface.

In some implementations, for each of the left and right side panels, a portion of the front outer surface is disposed lower than the front lateral surface.

In some implementations, for each of the left and right side panels, the front outer surface is aligned in the lateral direction with the outer portion of the corresponding one of the left toe hold and the right toe hold.

In some implementations, a front end of the left footrest is disposed longitudinally forward of the left toe hold and a front end of the right footrest is disposed longitudinally forward of the right toe hold.

In some implementations, for each of the right and left toe holds, a biasing element rotatably connects the outer portion to the inner portion, the biasing element biasing the outer portion toward an extended position.

In some implementations, for each of the right and left toe holds, the outer portion is connected to the inner portion by a hinge.

In some implementations, the snowmobile further comprises a right base with the right toe hold being movably connected to the right base and a left base with the left toe hold being movably connected to the left base. One of the right base and the left base is connected to the chaincase cover and an other of the right base and the left base is connected to the frame.

In some implementations, for each of the right and left toe holds, the toe hold is vertically translatable with respect to its corresponding base.

In some implementations, for each of the right and left toe holds, the toe hold is longitudinally translatable with respect to its corresponding base.

In some implementations, for each of the right and left toe holds, the toe hold is vertically translatable with respect to the frame.

In some implementations, for each of the right and left toe holds, the toe hold is longitudinally translatable with respect to the frame.

For purposes of this application, terms related to spatial orientation such as forwardly, rearwardly, upwardly, downwardly, left, and right, are as they would normally be understood by a driver of the vehicle sitting thereon in a normal riding position. Terms related to spatial orientation when describing or referring to components or sub-assemblies of the vehicle, separately from the vehicle, such as the side panel for example, should be understood as they would be understood when these components or sub-assemblies are mounted to the vehicle.

Definitions and explanations of terms provided herein take precedence over definitions and explanations of those terms in any of the documents incorporated herein by reference.

Implementations of the present technology each have at least one of the above-mentioned aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 2D is a cross-sectional view taken along the line 2D of FIG. 2B;

FIG. 3C is a rear elevation view of the right side panel of FIG. 3A;

FIG. 4B is a right side elevation view of the snowmobile portion and rider of FIG. 4A with the rider seated thereon in a rightward leaning position with the vehicle turning towards the right;

FIG. 7A is a perspective view, taken from a top, rear and right side of an alternative implementation of a right toe hold of the snowmobile of FIG. 1;

FIG. 7B is a top plan view of the right toe hold of FIG. 7A;

FIG. 7C is a rear elevation view of the right toe hold of FIG. 7A;

FIG. 7D is a right side elevation view of the right toe hold of FIG. 7A;

FIG. 8A is a right side elevation view of the right toe hold of FIG. 7A mounted to a chaincase cover of the snowmobile of FIG. 1;

FIG. 8B is a rear elevation view of the right toe hold and chaincase cover of FIG. 8A;

FIG. 9A is a perspective view, taken from a top, rear and right side of another alternative implementation of a left toe hold of the snowmobile of FIG. 1;

FIG. 9B is a top plan view of the left toe hold of FIG. 9A;

FIG. 9C is a left side elevation view of the left toe hold of FIG. 9A;

FIG. 9D is a rear elevation view of the left toe hold of FIG. 9A;

FIG. 10A is a perspective view, taken from a top, rear and right side of another alternative implementation of a right toe hold of the snowmobile of FIG. 1;

FIG. 10B is a top plan view of the right toe hold of FIG. 10A;

FIG. 10C is a right side elevation view of the right toe hold of FIG. 10A;

FIG. 10D is a rear elevation view of the right toe hold of FIG. 10A;

DETAILED DESCRIPTION

Although the present technology is described below with respect to a snowmobile, it is contemplated that aspects could be applied to other straddle-seat vehicles, such as motorcycles and the like.

Figure 1:
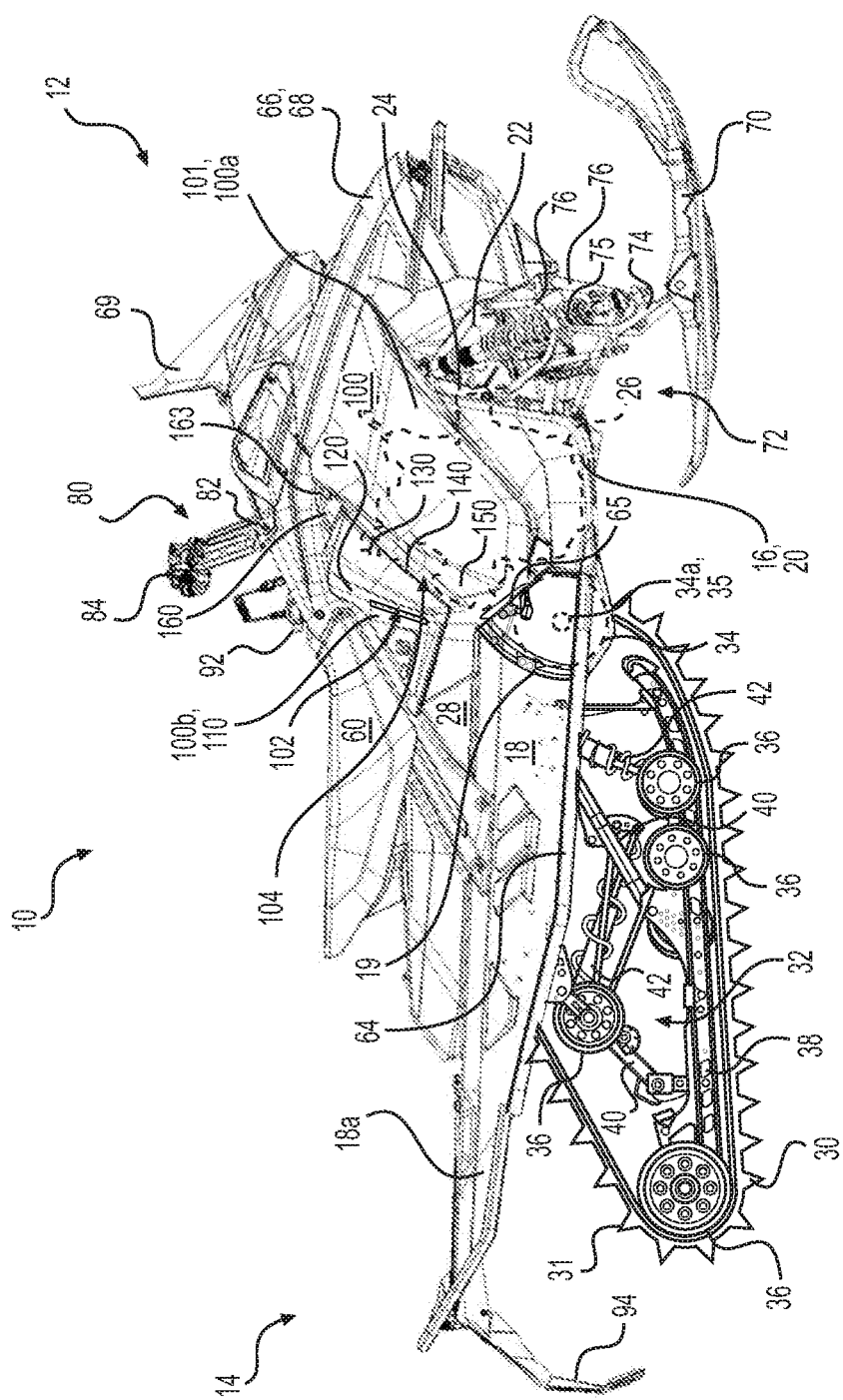
FIG. 1 is a right side elevation view of a snowmobile.

With reference to FIG. 1, a snowmobile 10 includes a front end 12 and a rear end 14 which are defined consistently with a travel direction of the vehicle 10. The snowmobile 10 includes a vehicle body in the form of a frame or chassis 16 which includes a rear tunnel 18, an engine support structure 20, a front suspension module 22 and an upper structure 24. The tunnel 18 is formed from sheet metal parts assembled to form an inverted U-shape when viewed from the forward or rearward end 12, 14. The inverted U-shaped tunnel 18 has a left side portion 18a and a right side portion 18a. A vertically extending longitudinal plane 13 (FIG. 2B) passing through a lateral center of the snowmobile 10 is referred to herein as the longitudinal centerplane 13 of the snowmobile 10.

Figure 2A:
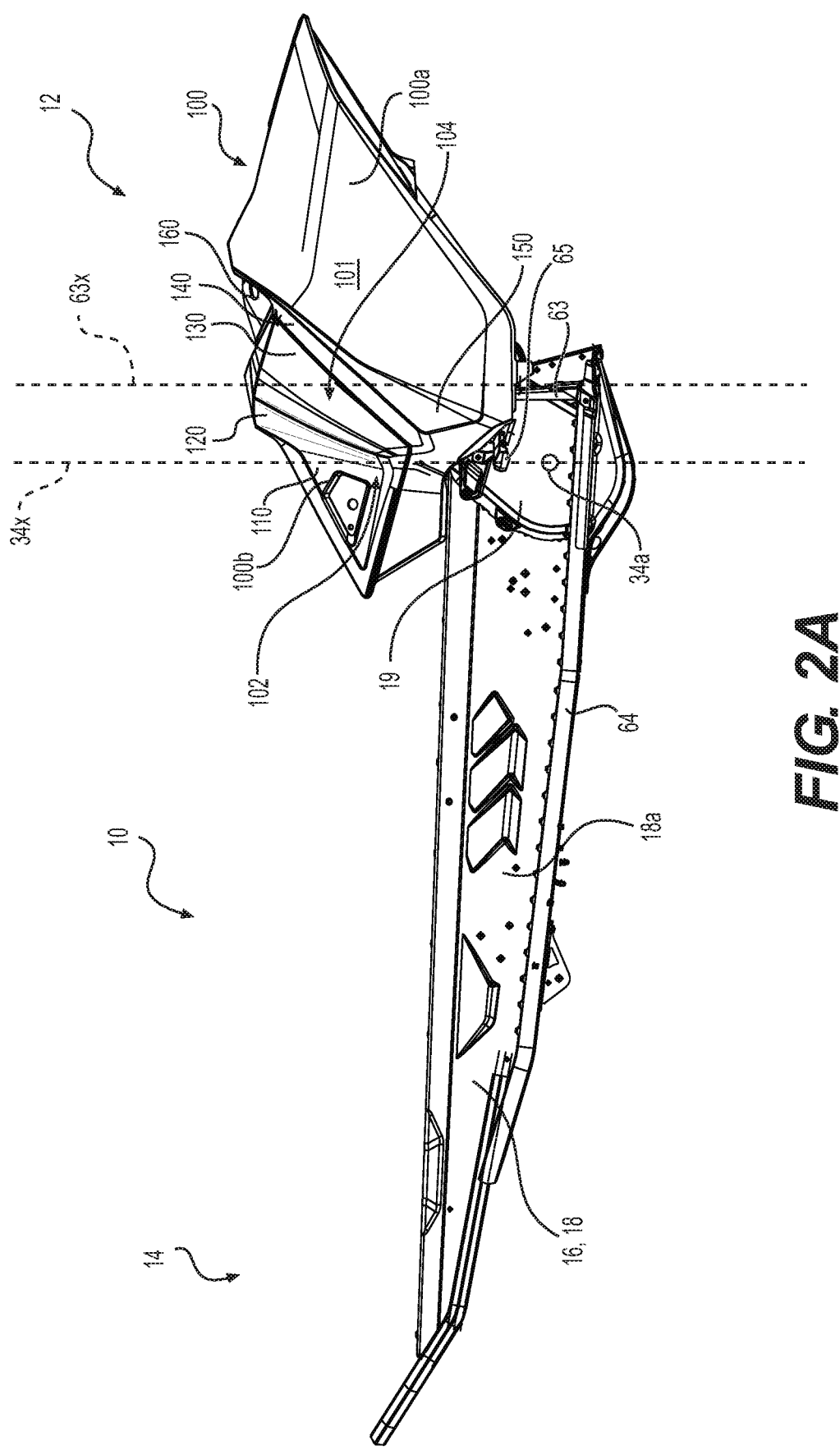
FIG. 2A is a right side elevation view of a portion of the snowmobile of FIG. 1 including a tunnel having mounted thereto a right side panel.
Figure 2B:
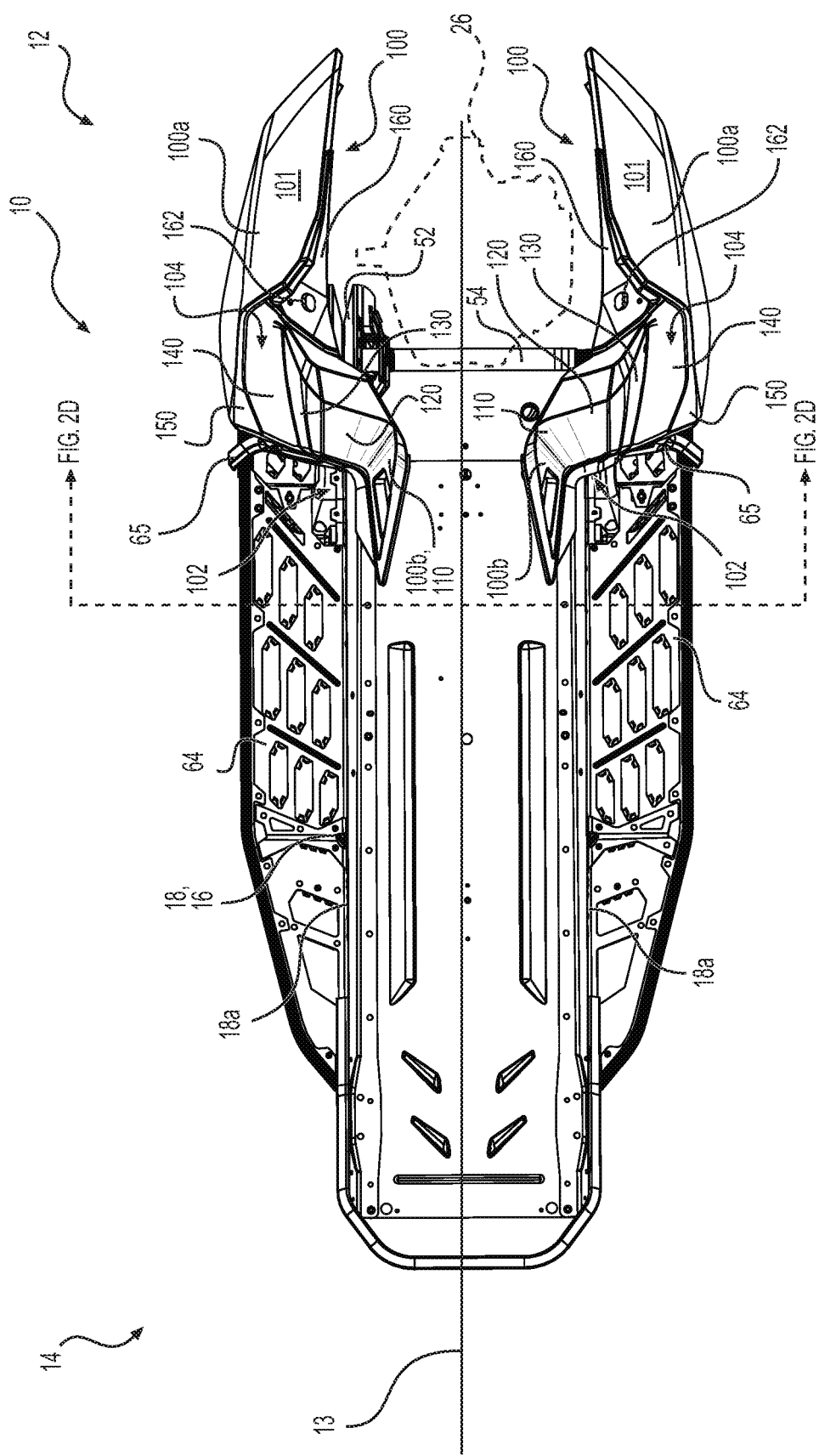
FIG. 2B is a top plan view of the portion of the snowmobile of FIG. 2A also showing a left side panel, and a driven pulley and countershaft of a continuously variable transmission.

An endless drive track 30 is positioned generally under the tunnel 18, and operatively connected to the engine 26 via a drivetrain including a belt transmission system (a driven pulley 52 and a countershaft 54 of the belt transmission system being shown in FIG. 2B) and a reduction gear assembly 270 (shown schematically in FIG. 8A). The endless drive track 30 is driven to run about a rear suspension assembly 32 connected to the frame 16 for propulsion of the snowmobile 10. The endless drive track 30 has a plurality of lugs 31 extending from an outer surface thereof to provide traction to the track 30. Further details regarding the snowmobile drivetrain can be found in U.S. Pat. No. 8,012,050 issued on Sep. 6, 2011, the entirety of which is incorporated herein by reference.

The rear suspension assembly 32 includes a pair of drive sprockets 34 (shown schematically) mounted on a drive axle 35 (shown schematically), one or more idler wheels 36 and a pair of slide rails 38 in sliding contact with the endless drive track 30. The drive axle 35 having the pair of drive sprockets 34 mounted thereon defines a drive axle axis 34a. The slide rails 38 are attached to the tunnel 18 by front and rear suspension arms 40 and one or more shock absorbers 42 which include a coil spring surrounding the individual shock absorbers 42. It is contemplated that the snowmobile 10 could be provided with a different implementation of a rear suspension assembly 32 than the one shown herein.

Figure 2C:
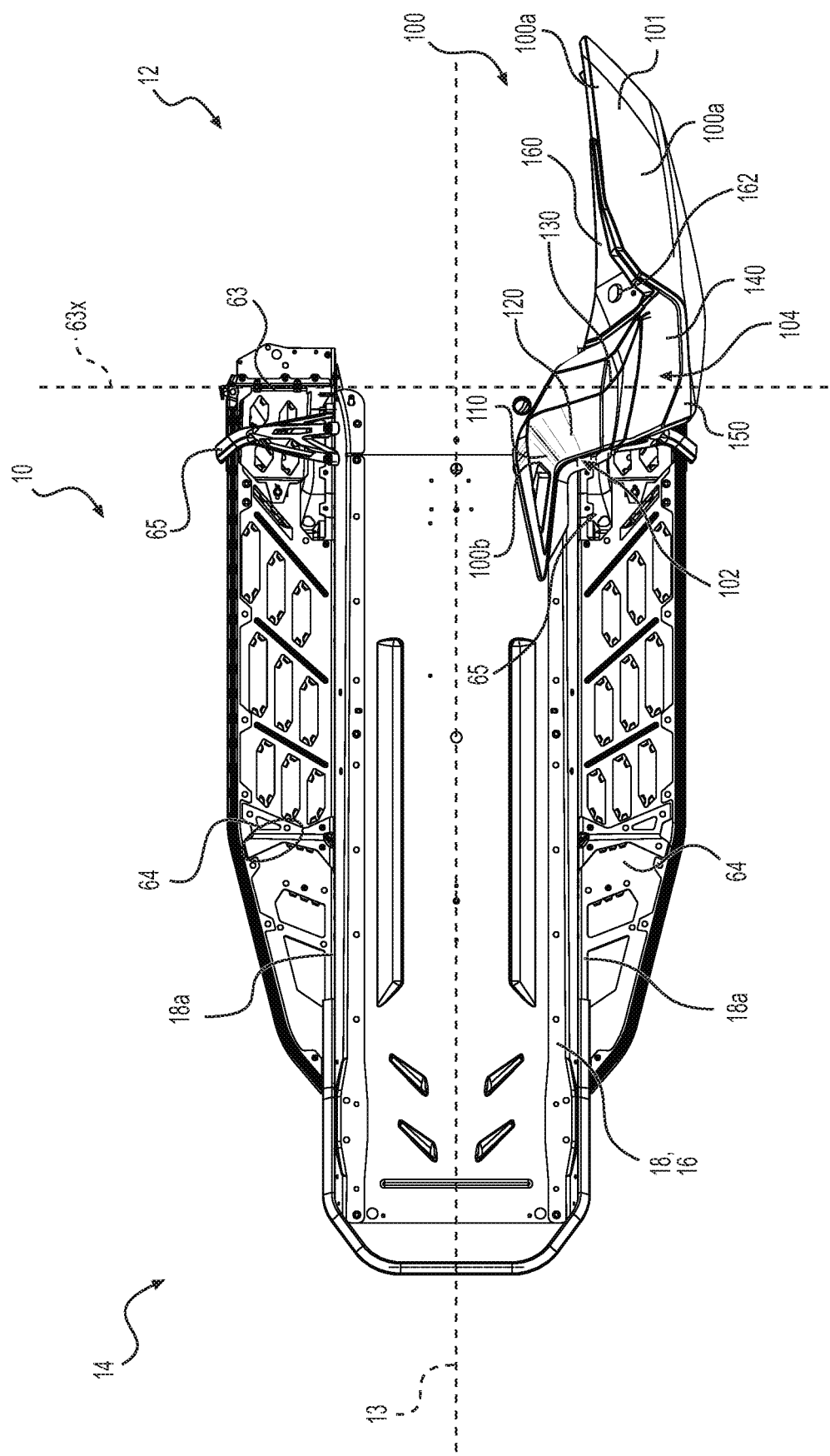
FIG. 2C is a top plan view of the portion of the snowmobile of FIG. 2B with the left side panel, the driven pulley and the countershaft removed for clarity.
Figure 3A:
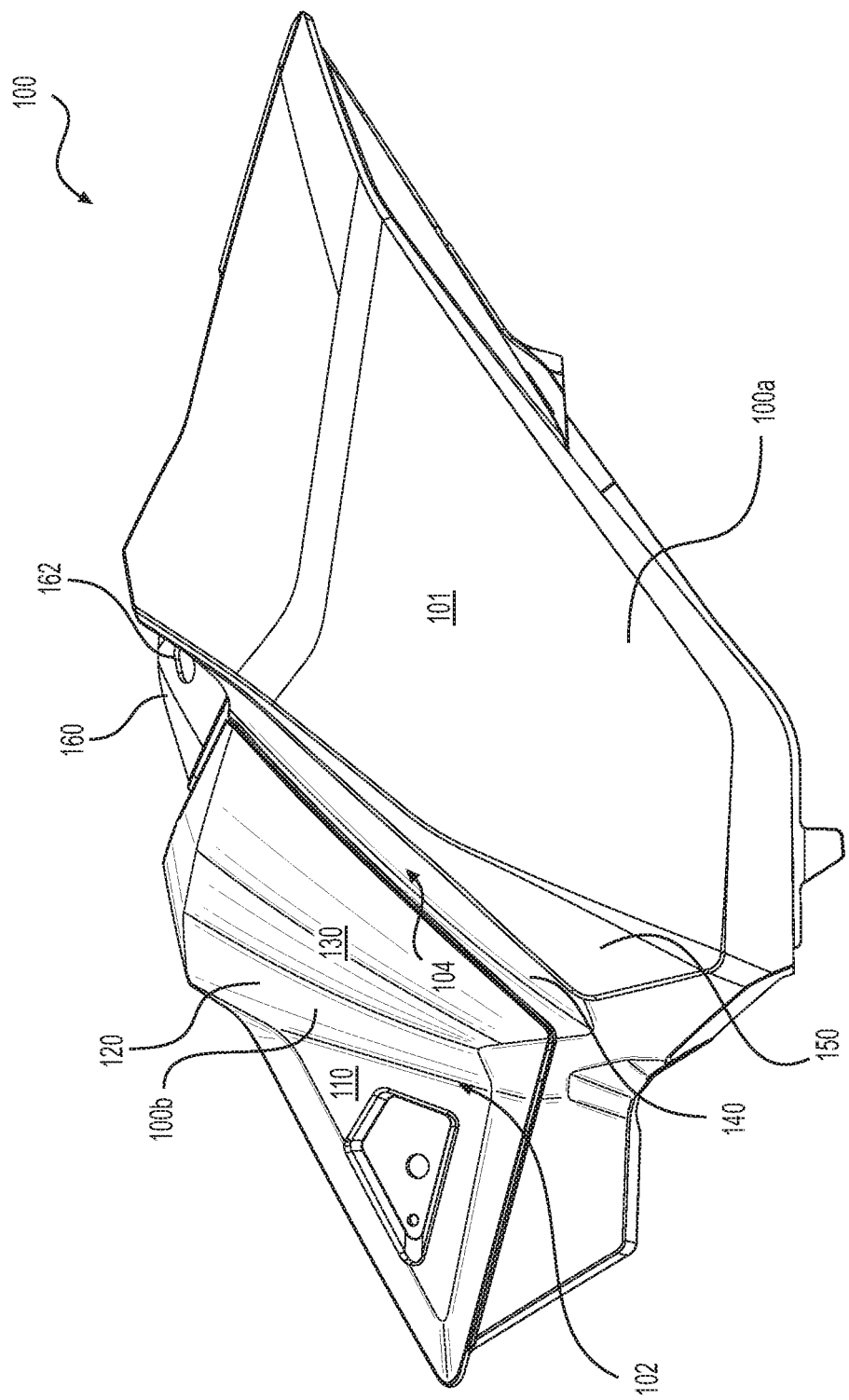
FIG. 3A is a right side elevation view of the right side panel of FIG. 2A shown in isolation.
Figure 3B:
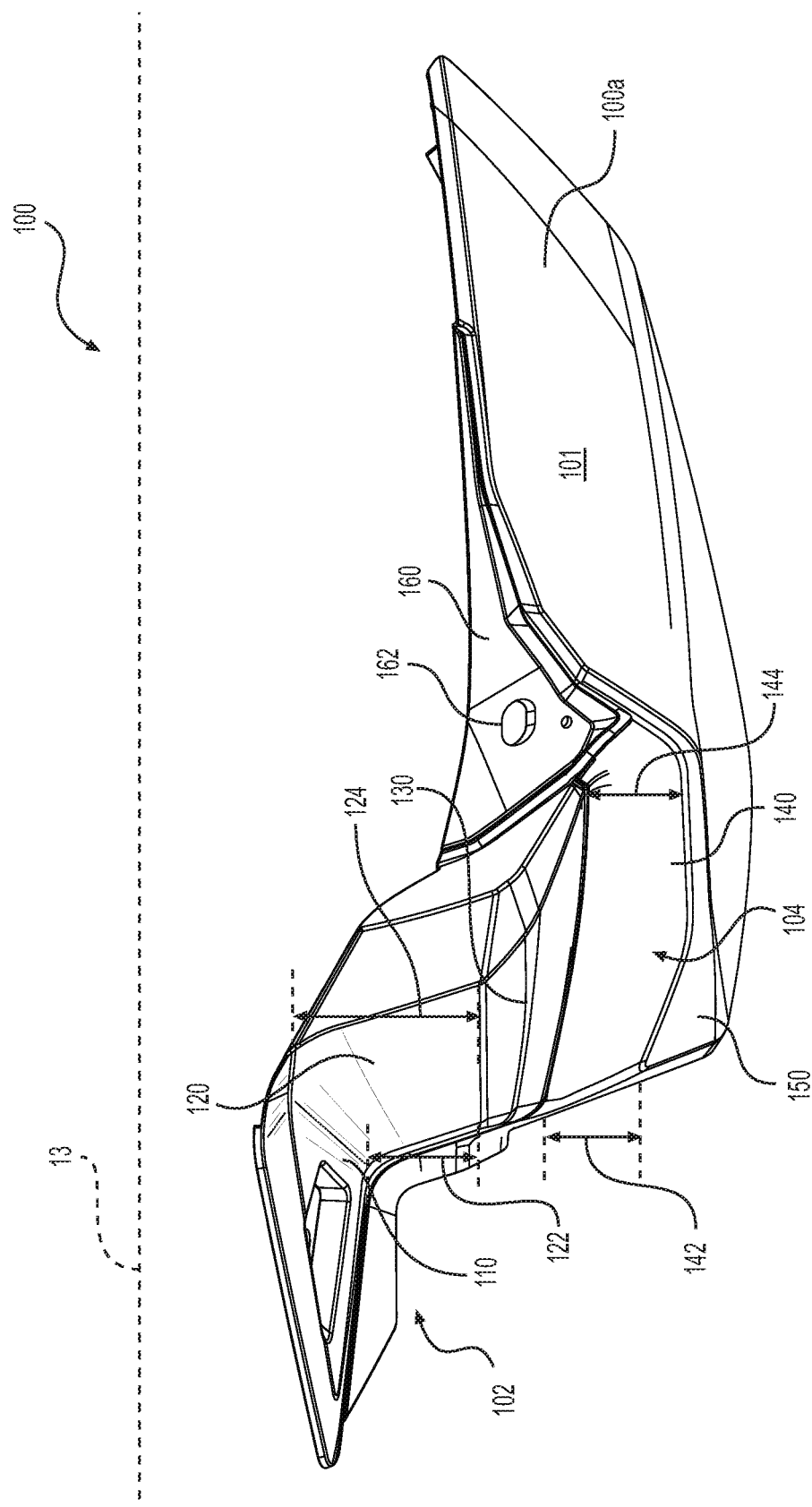
FIG. 3B is a top plan view of the right side panel of FIG. 3A.

A straddle-type seat 60 is positioned atop the fuel tank 28. A fuel tank fill opening covered by a cap 92 is disposed on the upper surface of the fuel tank 28 in front of the seat 60. It is contemplated that the fuel tank fill opening 92 could be disposed elsewhere on the fuel tank 28. The seat 60 is adapted to accommodate a driver of the snowmobile 10. The seat 60 can also be configured to accommodate a passenger. A footrest 64 is positioned on each side of the snowmobile 10 below the seat 60 to accommodate the driver's feet. Each of the left and right footrests 64 extends generally laterally outwardly from the corresponding left and right side portion of the tunnel 18. In the illustrated implementation, each side portion 18a of the tunnel 18 is bent laterally outwardly at its bottom edge to form the corresponding footrest 64. It is however contemplated that the footrest 64 could not be formed integrally with the tunnel 18 but could be formed separately and mounted thereto. A footstop 63 (best seen in FIG. 2A) is connected to the front end of each footrest 64. In the illustrated implementation, each footstop 63 is in the form of a wall-like structure extending generally laterally and vertically upwardly from the corresponding footrest 64 and thereby prevents the driver's foot resting on the footrest 64 from sliding forward past the front end of the footrest 64. It is contemplated that one or both of the footstops 63 could be configured differently than as shown herein. It is contemplated that one or both of the footstops 63 could be formed integrally with the corresponding footrest 64 and/or the tunnel 18. A toe hold 65 is disposed above the front portion of each footrest 64 and longitudinally rearwardly of the corresponding footstop 63. Each toe hold 65 is in the form of a cantilever-like structure being connected at its laterally inner end and extending laterally outwardly therefrom. The right toe hold 65 is mounted to a chaincase 19 mounted to the right side portion 18a of the tunnel 18. The chaincase 19 extends over the reduction gear assembly 270 of the snowmobile drivetrain. As can be seen in FIG. 2B, the left toe hold 65 is mounted to the left side portion 18a of the tunnel 18 and extends laterally outwardly therefrom. As can be seen in FIGS. 2B to 2D, the outer end of each toe hold 65 is disposed laterally outwardly of the outer edge of the portion of the corresponding footrest 64 disposed therebelow. Further details regarding the toe holds 65 will be discussed below with reference to a pair of toe holds 200 (FIGS. 6A to 8B) similar to the pair of toe holds 65 (FIGS. 1 to 2D).

At the front end 12 of the snowmobile 10, fairings 66 enclose the engine 26, the continuous variable transmission system and other components of the powerpack such as the air intake system. The fairings 66 include a hood 68 which can be opened to allow access to the engine 26 and other internal components of the snowmobile 10 from the top and the front which may be required, for example, for inspection or maintenance of the engine 26 and/or powerpack. The fairings 66 also include a left side panel 100 (FIG. 2B) extending on a left side of the snowmobile 10 and a right side panel 100 extending on a right side of the snowmobile 10. The engine 26, the transmission system and the reduction gear assembly 270 are disposed between the left and right side panels 100. The left and right side panels 100 are both removably connected to the frame 16 and/or to other fairing panels and can be removed to access the internal components from the corresponding lateral side. In the illustrated implementation, the panels 100 are hinged for connection to the frame 16 and/or other fairing panels 66. It is contemplated that the panels 100 could be removably connected to the frame 16 and/or other fairing panels 66 by other kinds of removable connections, such as a latch, a clip, or the like. The side panels 100 will be described below in further detail.

A windshield 69 connected to the fairings 66 acts as a wind screen to lessen the force of the air on the rider while the snowmobile 10 is moving.

Two skis 70 positioned at the forward end 12 of the snowmobile 10 are attached to the front suspension module 22 of the frame 16 through a front suspension assembly 72. The front suspension module 22 is connected to the front end of the engine support structure 24. The front suspension assembly 72 includes ski legs 74, shock absorbers 75, supporting arms 76 and ball joints (not shown) for operatively connecting to the respective ski leg 74, supporting arms 76 and a steering column 82.

A steering assembly 80, including the steering column 82 and a handlebar 84, is provided generally forward of the seat 60. The steering column 82 is rotatably connected to the frame 16. The lower end of the steering column 82 is connected to the ski legs 74 via a steering rod (not shown). The handlebar 84 is attached to the upper end of the steering column 82. The handlebar 84 is positioned in front of the seat 60. The handlebar 84 is used to rotate the steering column 82, and thereby the skis 70, in order to steer the vehicle 10. A throttle operator (not shown) in the form of a thumb-actuated throttle lever is mounted to the right side of the handlebar 84. Other types of throttle operators, such as a finger-actuated throttle lever and a twist grip, are also contemplated. A brake actuator (not indicated), in the form of a hand brake lever, is provided on the left side of the handlebar 84 for braking the snowmobile 10 in a known manner. It is contemplated that the windshield 69 could be connected directly to the handlebar 84.

At the rear end of the snowmobile 10, a snow flap 94 extends downward from the rear end of the tunnel 18. The snow flap 94 protects against dirt that can be projected upward from the drive track 30 when the snowmobile 10 is being driven. It is contemplated that the snow flap 94 could be omitted.

The snowmobile 10 includes other components such as a display cluster, an exhaust system, an air intake system, and the like. As it is believed that these components would be readily recognized by one of ordinary skill in the art, further explanation and description of these components will not be provided herein.

The right side panel 100 will now be described with reference to FIGS. 2A to 3C.

With reference to FIGS. 2A to 2C, the right side panel 100 is disposed on a right side of the longitudinal centerplane 13 (FIG. 2B). The right side panel 100 extends in part upwards from the tunnel 18, in part forwardly therefrom, and in part on a right side of the right side portion 18a thereof. The right side panel 100 has a front portion 100a and a rear portion 100b. A bottom edge of the right side panel 100 is disposed on a right side of the right side portion 18a of the tunnel 18 and vertically between the upper tunnel surface and the footrest 64. The right toe hold 65 is disposed in a space defined by the bottom edge of the rear portion 100b of the right side panel 100 and the right footrest 64. The front portion 100a extends forwardly and upwardly from the bottom edge of the right side panel 100. The front portion 100a extends longitudinally forward of the right footrest 64, the right toe hold 65 and the front of the tunnel 18. The rear portion 100b of the right side panel 100 extends rearwardly and upwardly from the bottom edge, above the right toe hold 65 on a right side of the right tunnel portion 18a. A portion of the rear portion 100b extends above the tunnel 18 and on a right side of the fuel tank 28. A portion of the lower edge of the rear portion 100b is disposed on the upper surface of the tunnel 18. In the illustrated implementation, the right side panel 100 is formed as a single integral panel. It is contemplated that the right side panel 100 could have a plurality of panels connected together.

With reference to FIGS. 2A to 3C, the right side panel 100 has an outer surface 101 facing laterally outwardly away from the longitudinal centerplane 13, and from the fuel tank 28, the engine 26 and other internal components of the snowmobile 10. The outer surface 101 has a rear longitudinally extending surface portion 110, a rear laterally extending surface portion 120, a front longitudinally extending surface portion 130, a front laterally extending surface portion 140, and a front outer surface portion 150 which will be described below in further detail. For convenience, the above-mentioned surface portions 110, 120, 130, 140, 150 are referred to respectively as the rear longitudinal surface 110, the rear lateral surface 120, the front longitudinal surface 130, the front lateral surface 140, and the front outer surface 150. Each of the rear lateral surface 120 and the front lateral surfaces 140 extends in the lateral as well as longitudinal directions. However, these surfaces 120, 140 are referred to as lateral surfaces 120, 140 since their contribution to the overall width of the rear portion 100b of the side panel 100 is greater than that of the longitudinal surfaces 110, 130. Each of rear longitudinal surface 110 and the front longitudinal surface 130 extends in the longitudinal and the lateral directions but much less than in the lateral direction than in the longitudinal direction as can be seen in the Figures.

With reference to FIGS. 2A to 3C, the rear longitudinal surface 110 extends generally vertically and longitudinally on a right side of the fuel tank 28. The fuel tank fill opening and cap 92 located on the upper surface of the fuel tank 28 is disposed so as to be aligned in the longitudinal direction with the front portion of the rear longitudinal surface 110. A vertical plane 34x containing the drive axle axis 34a intersects the rear longitudinal surface 110. The rear longitudinal surface 110 is disposed above the right side portion 18a and the right edge of the upper surface of the tunnel 18 as can be seen in FIG. 2B.

With reference to FIGS. 2A to 3C, the rear lateral surface 120 extends laterally outwardly from the front end of the rear longitudinal surface 110. The rear lateral surface 120 slopes gently forwardly from its lower end to its upper end. The rear lateral surface 120 has widths 122, 124 (i.e. width measured in the direction normal to the longitudinal centerplane 13). The width 122 of the lower portion of the rear lateral surface 120 is smaller than the width 124 of the upper portion thereof. In the lower portion, the width 122 increases continuously in an upward direction. In the upper portion the width 124 is generally constant as can be seen best in FIG. 3C. It is contemplated that the lateral direction width 122, 124 of the rear laterally extending surface 120, or a part thereof, could decrease in an upward direction, or remain constant. The outer edge of the rear lateral surface 120 is disposed on a right side of the tunnel 18 above the footrest 64 as can be seen in FIG. 2D. As can be seen in FIG. 2A, the lower end of the rear lateral surface 120 is disposed longitudinally forward of the vertical plane 34x containing the drive axle axis 34a and is generally longitudinally aligned with the toe hold 65. The upper portion of the rear lateral surface 120 is disposed longitudinally forwardly of the toe hold 65.

As can be seen in FIG. 2A, the rear lateral and longitudinal surfaces 120, 110 are disposed longitudinally rearward of the footstop 63. The rear longitudinal surface 110 and the rear lateral surface 120 define a rear right leg area 102 discussed below with reference to FIG. 4A.

With reference to FIGS. 2A to 3C, the front longitudinal surface 130 extends generally longitudinally and forwardly from the outer edge of the rear lateral surface 120. The front longitudinal surface 130 is aligned in the lateral direction with the footrest 64 as can be seen in FIG. 2B. The front end of the front longitudinal surface 130 extends slightly laterally outwardly of the rear end thereof (connected to the rear lateral surface 120). As can be seen in FIG. 3A, the longitudinal surface 130 has a length 132, 134 (measured in a longitudinal direction) that increases continuously from the lower portion (length 132) to the upper portion (length 134)

With reference to FIGS. 2A to 3C, the front lateral surface 140 extends laterally outwardly from the front end of the front longitudinal surface 130. The front lateral surface 140 is thus disposed laterally outwardly of the rear lateral surface 120 as can be seen in FIG. 2B. The width 144 (measured in the direction normal to the longitudinal centerplane 13) of the upper portion of the front lateral surface 140 is generally the same as the width of the lower portion 142. The upper portion width 144 of the front lateral surface 140 is smaller than the width 124 of the upper portion of the rear lateral surface 120. It is however contemplated that the lateral direction widths 142, 144 could be different than as shown herein. It is also contemplated that the lateral direction width of the front lateral surface 140, or a part thereof, could increase in an upward direction, or remain constant. As can be seen when viewed from a side as in FIGS. 2A and 3A, the front lateral surface 140 is also angled forwardly from its lower end toward its upper end. The front lateral surface 140 is angled further forwardly and away from a vertical plane (such as the plane 34x) extending perpendicular to the longitudinal centerplane 13 than the rear lateral surface 120. As can be seen in FIG. 2A, the lower end of the front lateral surface 140 is longitudinally closer to the lower end of the rear lateral surface 120 than the upper end of the front lateral surface 140 is to the upper end of the rear lateral surface 120. A vertical plane 63x extending perpendicular to the longitudinal centerline 13 and containing the footstop 63 intersects the front lateral and longitudinal surfaces 140, 130. The front longitudinal surface 130 and the front lateral surface 140 define a front right leg area 104 discussed below with reference to FIGS. 4B and 4D.

With reference to FIGS. 2A to 3C, the front outer surface 150 extends laterally outwardly and forwardly from the front lateral surface 140 to the front portion 100a of the right side panel 100. The front outer surface 150 has a generally triangular lower portion connected to a narrow strip forming the front upper portion. As can be seen in FIG. 2A, the triangular lower portion of the front outer surface 150 extends vertically lower than the lower end of the front lateral surface 140. As can be seen in FIG. 2A, the triangular lower portion of the front outer surface 150 extends vertically lower than the upper surface of the tunnel 18. As can be seen in FIG. 2B, in the illustrated implementation, this triangular lower portion of the front outer surface 150 is disposed above the outer edge of the front portion of the footrest 64. The triangular portion of the front outer surface 150 is disposed longitudinally forward of an outer portion of the toe hold 65. The outer portion of the toe hold 65 extends rearwardly in a laterally outward direction.

With reference to FIGS. 2B, 2C, 3B and 3C, the front portion 100a of the right side panel 100 will now be described briefly. In the front portion 100a, a portion of the outer surface 101 extends laterally outwardly and forwardly from the right end of the front outer surface 150 as can be seen best in FIGS. 2B and 2D. It is however contemplated that the right side panel 100 could extend further or less laterally outwardly than as shown herein. An upper portion of the outer surface 101 disposed vertically above and longitudinally forward of the upper ends of the front lateral and longitudinal surfaces 130 curves laterally inwardly as can be seen best in FIGS. 2B and 3B. It is contemplated that the shape of the front portion 100a could be different than as shown herein.

Figure 5A:
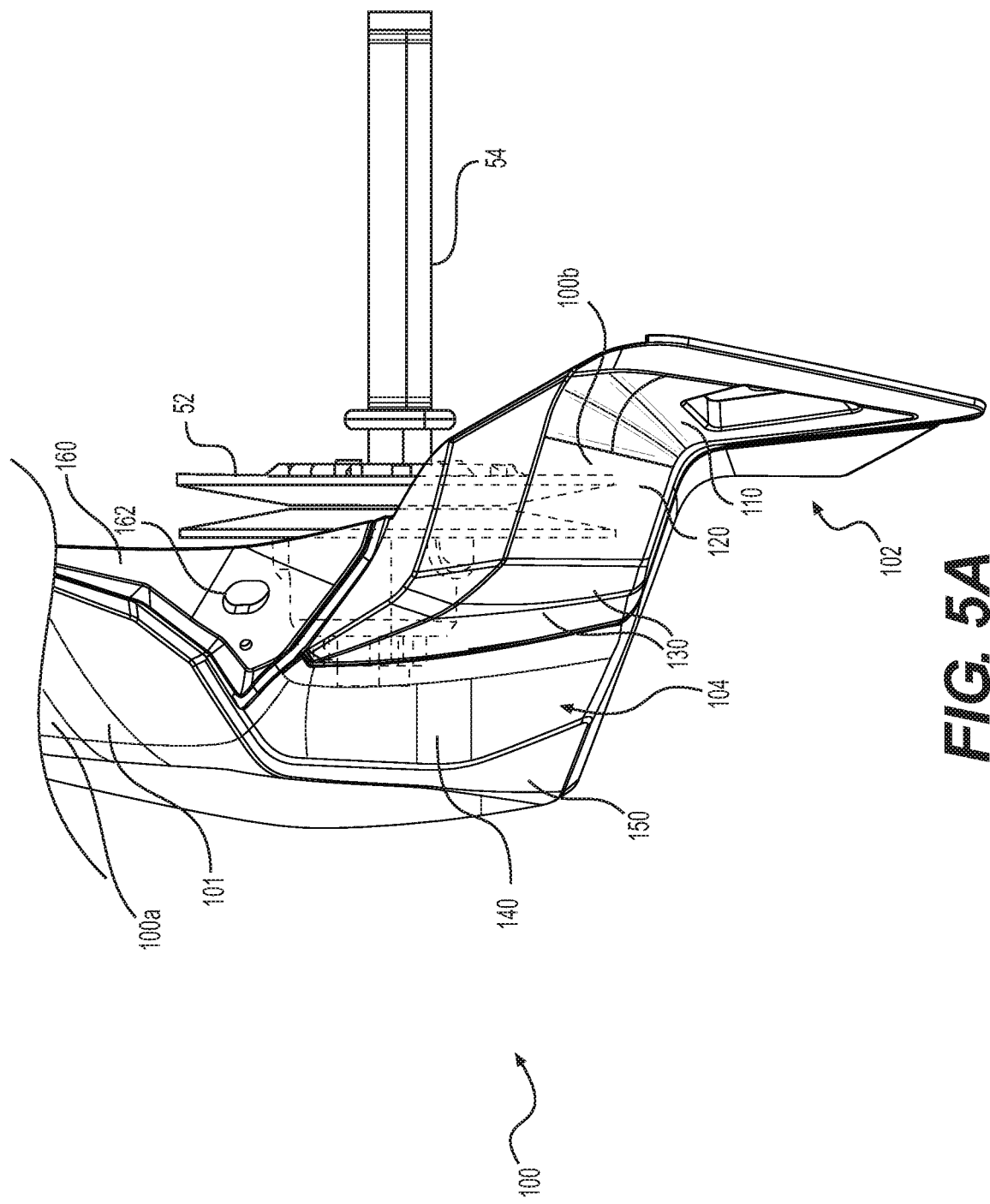
FIG. 5A is a close-up top plan view of a portion of the left side panel of FIG. 2B with the driven pulley and countershaft being shown partially in dotted lines.
Figure 5B:
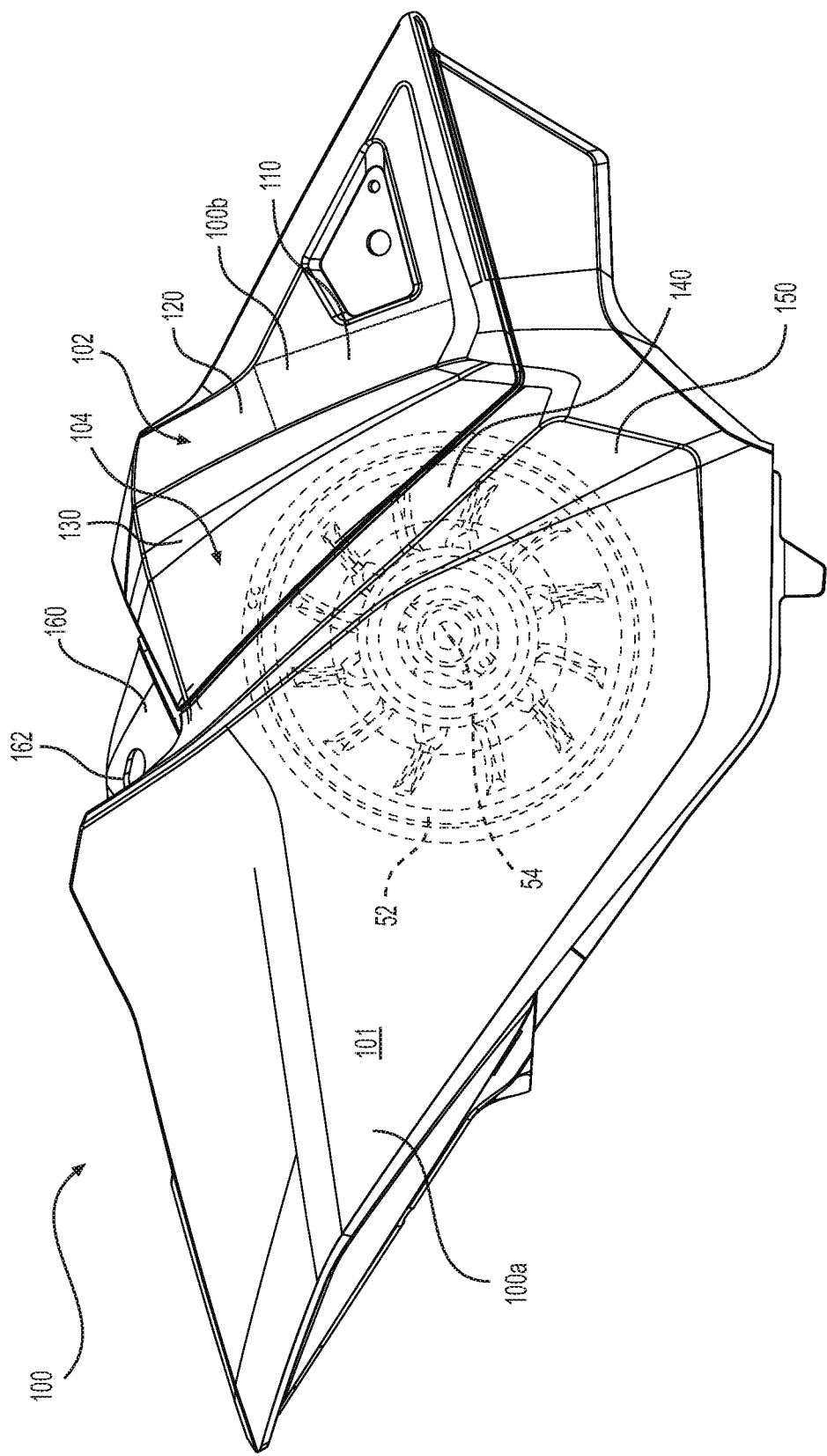
FIG. 5B is a left side elevation view of the left side panel, the driven pulley and countershaft of FIG. 5A.

With reference to FIGS. 2B, 5A and 5B, in the illustrated implementation, the left side panel 100 is nearly a mirror image of the right side panel 100 described above. As such, corresponding features of the left and right side panels 100 have been labeled with the same reference numbers and will not be described herein again in detail. It is contemplated that the left side panel 100 could be mirror image of the right side panel 100. As can be seen in FIGS. 2B, 5A and 5B, on the left side of the snowmobile 10, the driven pulley 52 is housed in a space formed by the front longitudinal surface 130 and the rear lateral surface 120 of the left side panel 100. The rear lateral surface 120 of the left side panel 100 extends upwardly and forwardly from behind the driven pulley 52 to above the drive pulley 52. The front longitudinal surface 130 extends generally longitudinally on a left side of the driven pulley 52. The inner portion 160 is disposed above the driven pulley 52.

It is however contemplated that the left side panel 100 could be different from the right side panel 100. For example, the rear longitudinal surface 110 could be omitted from the left side panel 100, or the front lateral surface 140 of the left side panel 100 could be different from the corresponding front lateral surface 140 of the right panel 100.

Figure 4A:
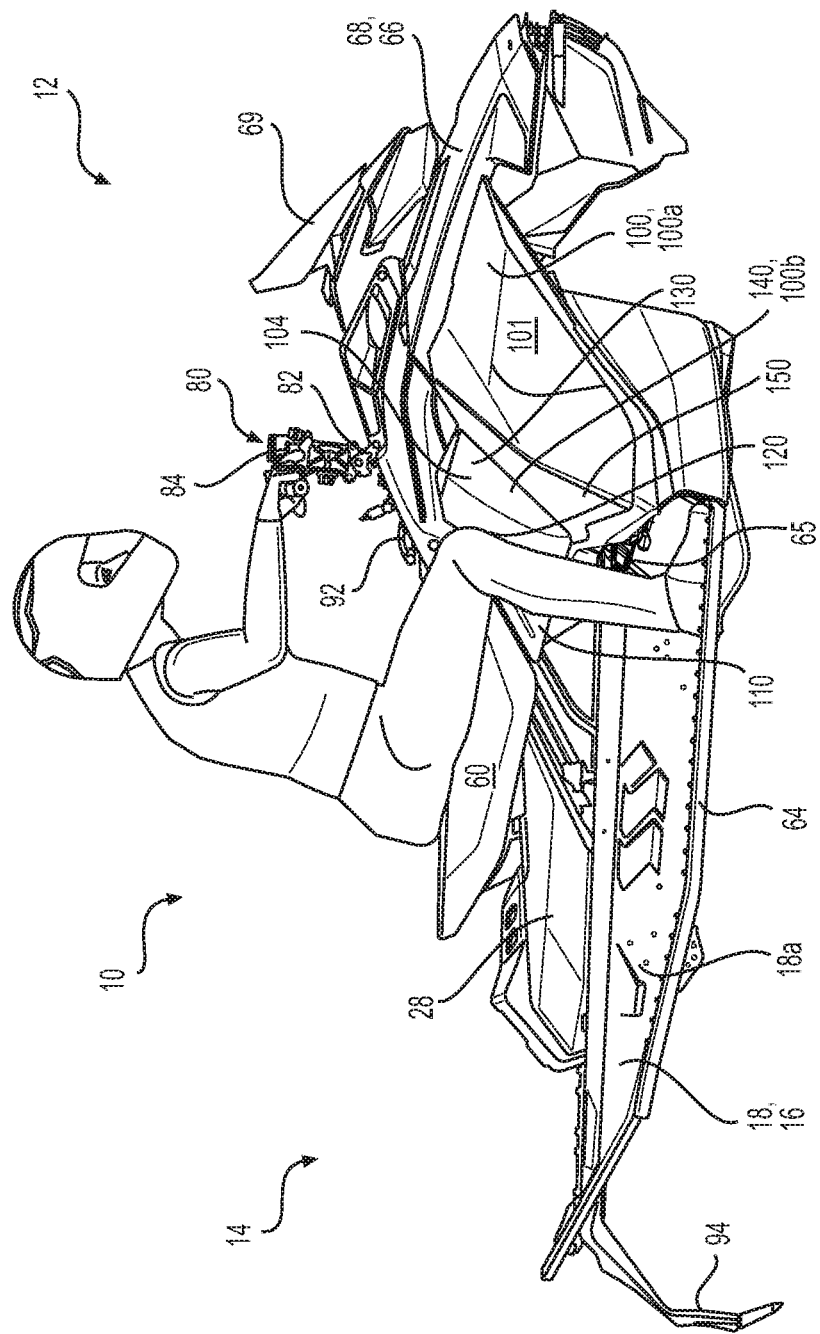
FIG. 4A is a right side elevation view of a portion of the snowmobile of FIG. 1 with a rider seated thereon in an upright riding position and the vehicle steered straight ahead.

With reference to FIG. 4A, when the driver is seated on the snowmobile 10 in an upright position with the snowmobile 10 steered straight ahead as seen in FIG. 4A, the driver's right leg below the knee is intended to be disposed in the rear right leg area 102 (indicated in FIG. 2A) with the inner surface of the right leg abutting the rear longitudinal surface 110 and the front surface of the right leg being disposed adjacent (proximate or abutting) the rear lateral surface 120. The width of the rear lateral surface 120 is large enough to prevent the front surface of the driver's leg from sliding forward inadvertently. The rear longitudinal surface 110 abutting the inside of the driver's leg provides and stability to the driver while riding the snowmobile 10. In this upright position, the driver's right knee is disposed generally longitudinally aligned with the right foot resting on the right footrest 64. Similarly, although not shown, the driver's left leg below the knee is intended to be disposed in the rear left leg area 102 defined by the left panel 100 with the inner surface of the left leg being disposed abutting the rear longitudinal surface 110 and the front surface of the left leg disposed adjacent the rear lateral surface 120. The driver's left knee is disposed generally longitudinally aligned with the left foot resting on the left footrest 64.

Figure 4C:
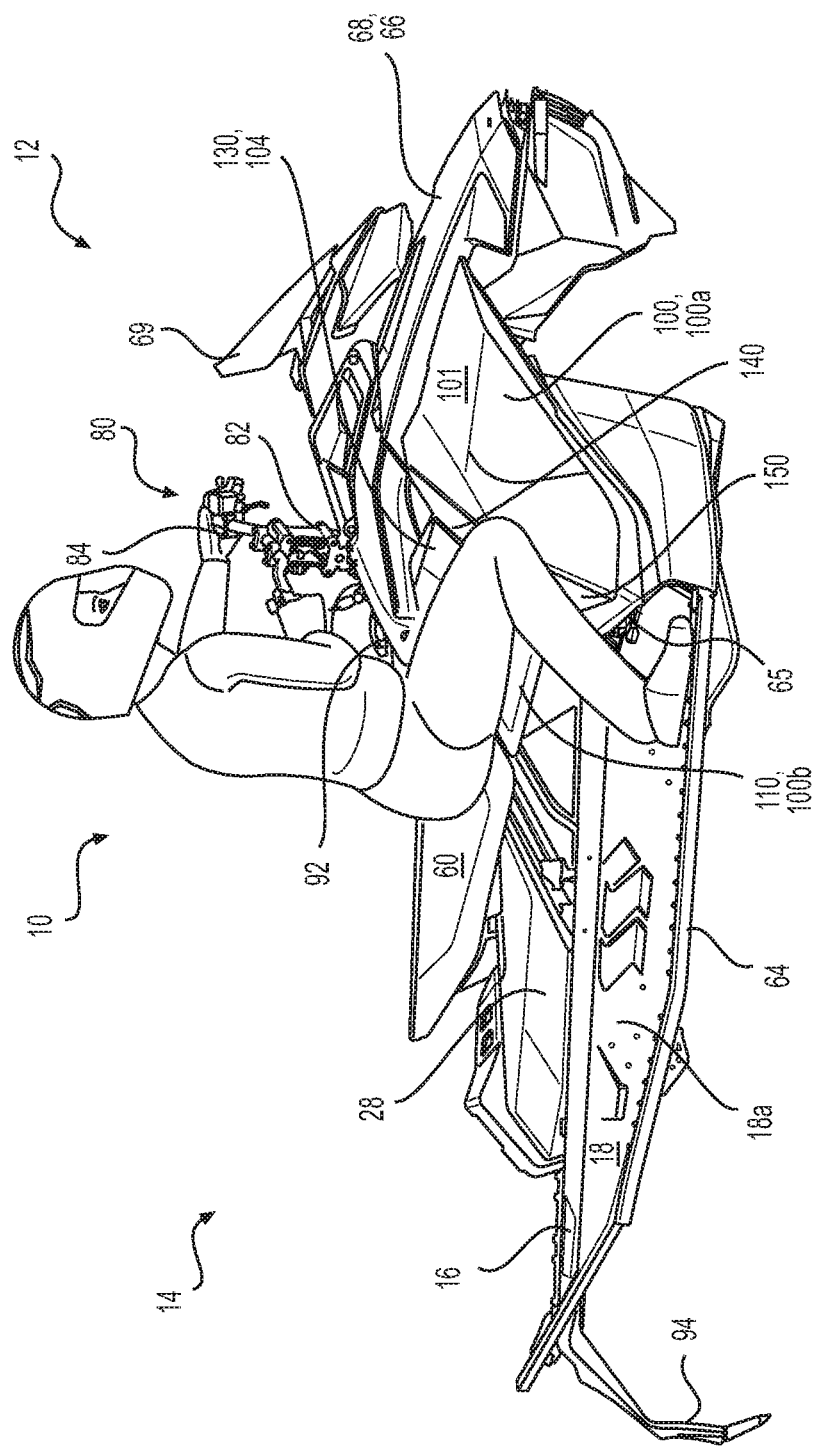
FIG. 4C is a right side elevation view of the snowmobile portion and rider of FIG. 4A with the rider seated thereon in an aggressive rightward leaning position with the vehicle aggressively turning towards the right.
Figure 4D:
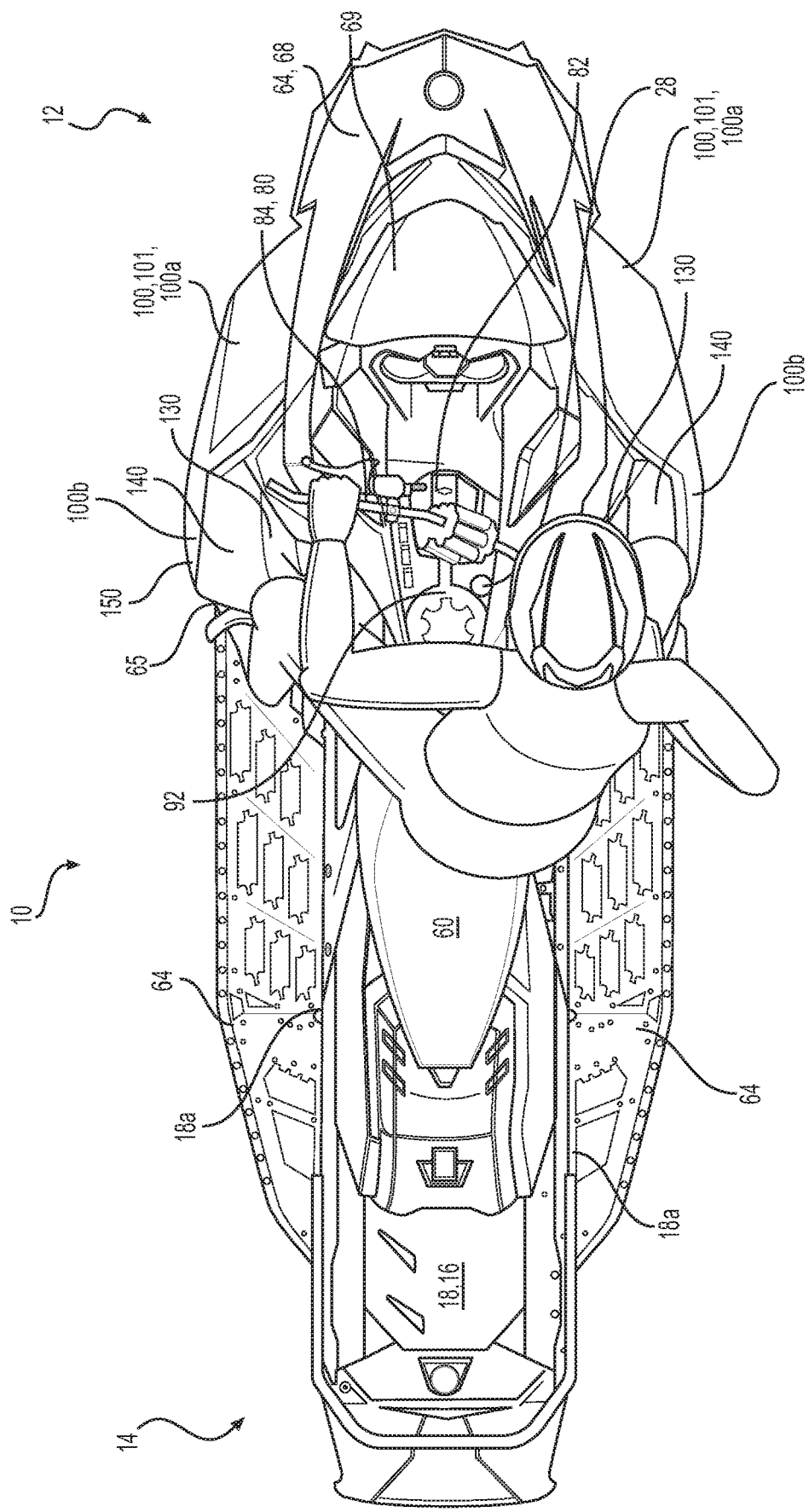
FIG. 4D is a top plan view of the snowmobile portion and rider of FIG. 4B.

With reference to FIGS. 4B and 4D, the driver leans forward and towards the right side of the snowmobile 10 while making a right turn with the snowmobile 10. In this rightward leaning position, the driver's knee and right leg below the knee is intended to be disposed in the front leg area 104. When the driver is in this rightward leaning position shown in FIG. 4B, the driver's right knee is disposed longitudinally forward of the driver's right foot such that the driver's right shin forms a smaller angle with the driver's foot than when in the upright position of FIG. 4A. As can be seen in FIG. 4D, in this rightward leaning position, the driver's left foot is intended to be slightly turned so that the front of the left foot is positioned near the left edge of the left footrest 64 while the back of the driver's left foot is disposed generally along the lateral center of the left footrest 64. The inside of the driver's right leg presses against the front longitudinal surface 130 and the front surface of the driver's right leg presses against the front lateral surface 140 for support and stability while the driver is positioned in this rightward leaning position.

Figure 4E:
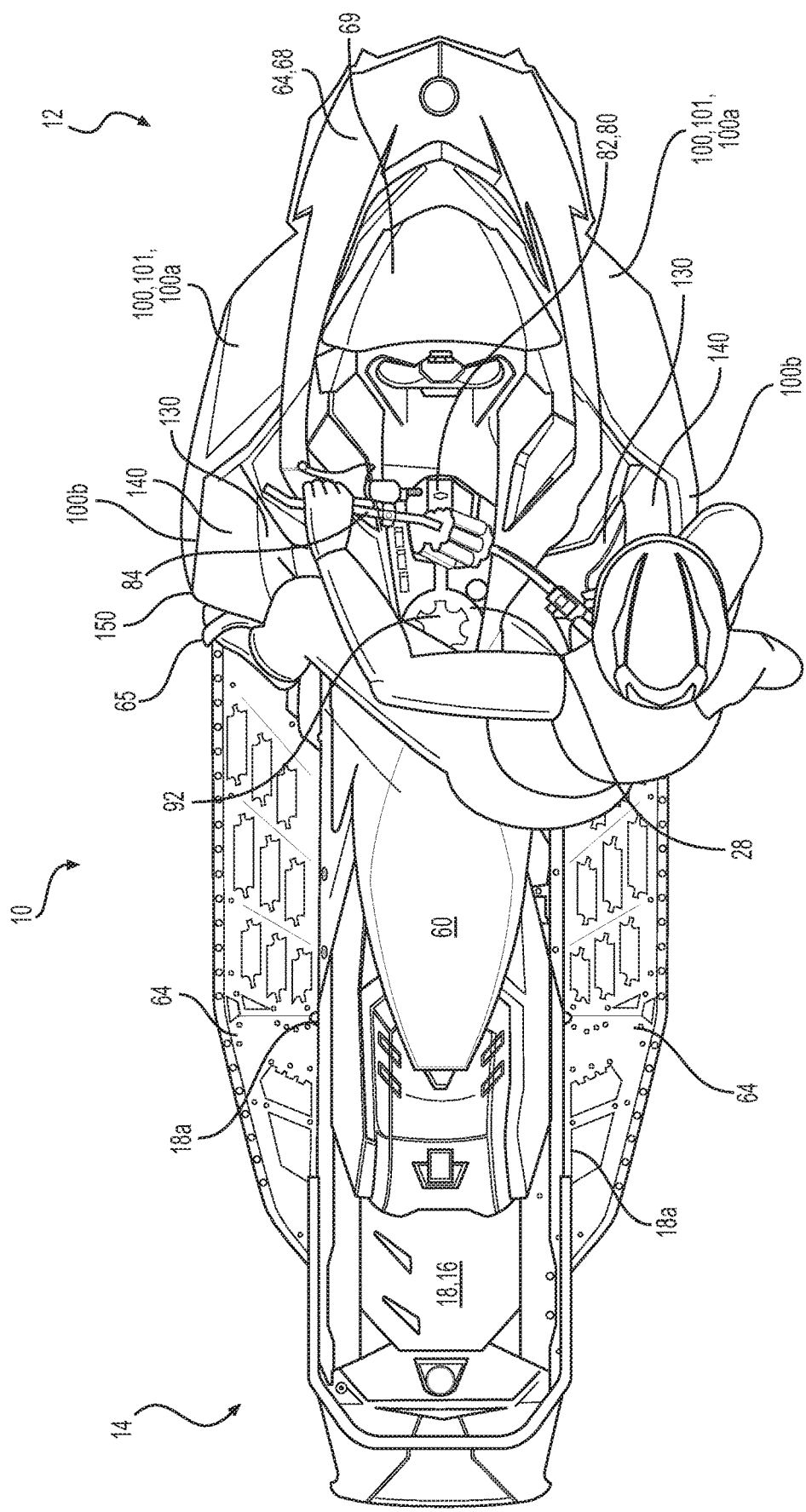
FIG. 4E is a top plan view of the snowmobile portion and rider of FIG. 4C.

With reference to FIGS. 4C and 4E, in some situations, such as while making an aggressive right turn with the snowmobile 10, the driver leans further rightwardly and forwardly than in the position shown in FIG. 4B. In this context, aggressive right turn could refer to turning while driving at a greater speed or executing a sharper turn than in FIG. 4B. The aggressive leaning position shown in FIG. 4C is however not to be limited with respect to any particular vehicle speed or curvature of turn, but rather defined with respect to the driver's position on the snowmobile 10 regardless of the vehicle operating condition in which the driver is thus positioned. In this aggressive rightward leaning position, the driver bends the right leg such that the right knee is disposed even further forward of the right foot than in the position shown in FIG. 4B. When the driver is in this aggressive rightward leaning position shown in FIG. 4C, the driver's right shin forms a smaller angle with the driver's foot than when in the upright position of FIG. 4A or the leaning position of FIG. 4B. In this aggressive rightward leaning position, the inside of the driver's right leg above the foot presses against the front outer surface 150 for support as can be seen in FIG. 4C. As can be seen in FIG. 4E, the driver's torso is supported near the right edge of the seat 60 and the driver's left foot is disposed pointing laterally outwardly when the driver is in the aggressive rightward leaning position of FIGS. 4C and 4E while making an aggressive right turn. The rear portion of the driver's left foot is resting near the left side tunnel surface 18a on the left footrest 64 while the front portion of the driver's left foot is disposed near the left edge of the left footrest 64. The outwardly oriented positioning of the driver's left foot serves to reduce stress on the driver's left knee compared to a position where the driver's left foot is pointing forwardly.

As will be understood, when the driver is steering the snowmobile 10 towards the left, the driver's position on the snowmobile 10 will generally be a mirror image of that described above with respect to FIGS. 4B, 4C and 4D.

The above describes the intended positioning of the driver's legs with respect to the side panels 100 and the snowmobile 10. The shape of the panel 100 described above is intended to facilitate the positioning of the driver as described above. It should however be understood that the driver of the snowmobile 10 may choose to position one or both legs differently than the intended positioning described above.

With reference to FIGS. 6A to 8B, a left toe hold 200 and a right toe hold 201 of the snowmobile 10 will now be described in detail. The left toe hold 200 is similar to the left toe hold 65 seen in FIGS. 2B to 2D, 4D 4A and 4E. The right toe hold 201 is similar to the right toe hold 65 seen in FIGS. 1 to 2D and 4A to 4E. The left toe hold 200 is similar to the right toe hold 201 and as such, corresponding features of the left and right toe holds 200, 201 have been labeled with the same reference numbers.

The left toe hold 200 has an inner portion 210, an outer portion 220 and a central portion 230 connecting the inner portion 210 to the outer portion 220. The outer portion 220 is disposed laterally outwardly (leftwardly) of the inner portion 210 when the left toe hold 200 is mounted on the snowmobile 10. The left toe hold 200 is mounted to the snowmobile 10 by its inner portion 210. The outer portion 220 is freely suspended above the left footrest 64.

Figure 9E:
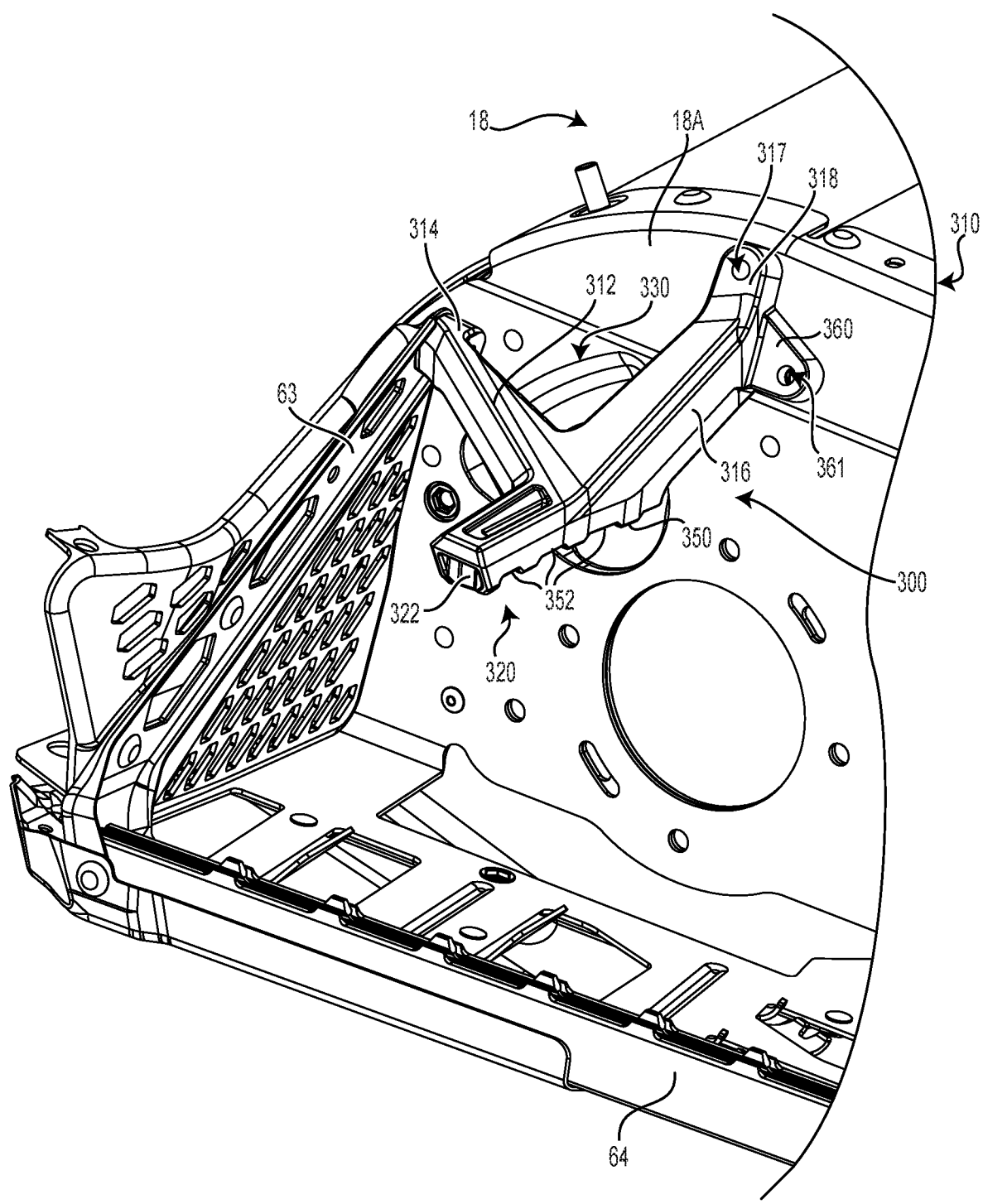
FIG. 9E is a perspective view, taken from a top, rear and left side of the left toe hold of FIG. 9A as installed on the tunnel of FIG. 2B.

The inner portion 210 includes a front mounting arm 212 and a rear mounting arm 216. An inner end 214 of the front mounting arm 212 has an aperture 213 through which a bolt (not shown) is inserted to mount the front mounting arm 212 to the footstop 63. In FIG. 9E, another implementation of a left toe hold 300 is illustrated connecting to the footstop 63 via a front mounting arm 312; the front arm 212 of the left toe hold 200 is attached in a similar configuration. The front mounting arm 212 extends rearwardly and laterally outwardly from the inner end 214 to the central portion 230. An inner end 218 of the rear mounting arm 216 has another aperture 217 through which a bolt (not shown) is inserted to mount the rear mounting arm 216 to the left side portion 18a of the tunnel 18. The rear mounting arm 216 extends forwardly, downwardly and laterally outwardly from the inner end 218 thereof to the central portion 230. The front mounting arm 212 is thus disposed lower than the rear mounting arm 216. It is however contemplated that the front and rear mounting arms 212, 216 could be configured differently than as shown herein. For example, the rear mounting arm 216 could be disposed lower than the front mounting arm 212. It is also contemplated that the inner portion 210 could have a single mounting arm or more than two mounting arms such as in the toe hold 65 which has three mounting arms (not indicated) as can be seen in FIG. 2C.

Figure 6A:
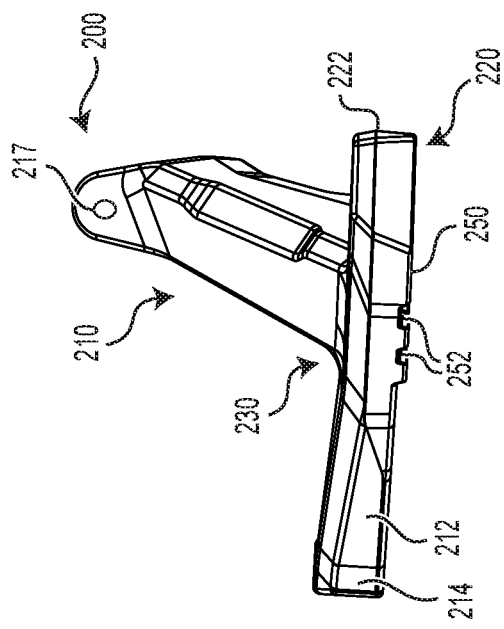
FIG. 6A is a top plan view of an alternative implementation of a left toe hold of the snowmobile of FIG. 1.
Figure 6B:
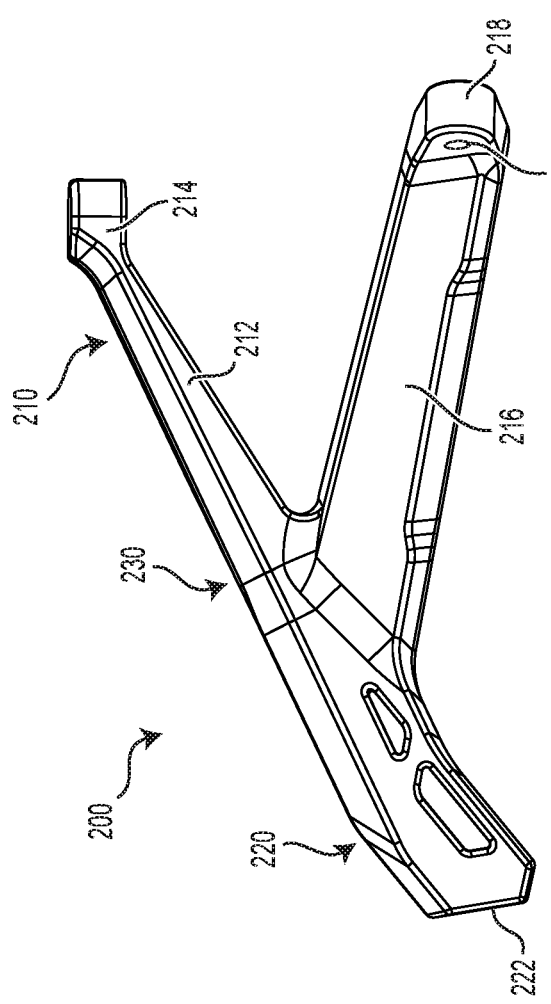
FIG. 6B is a rear elevation view of the left toe hold of FIG. 6A.
Figure 6C:
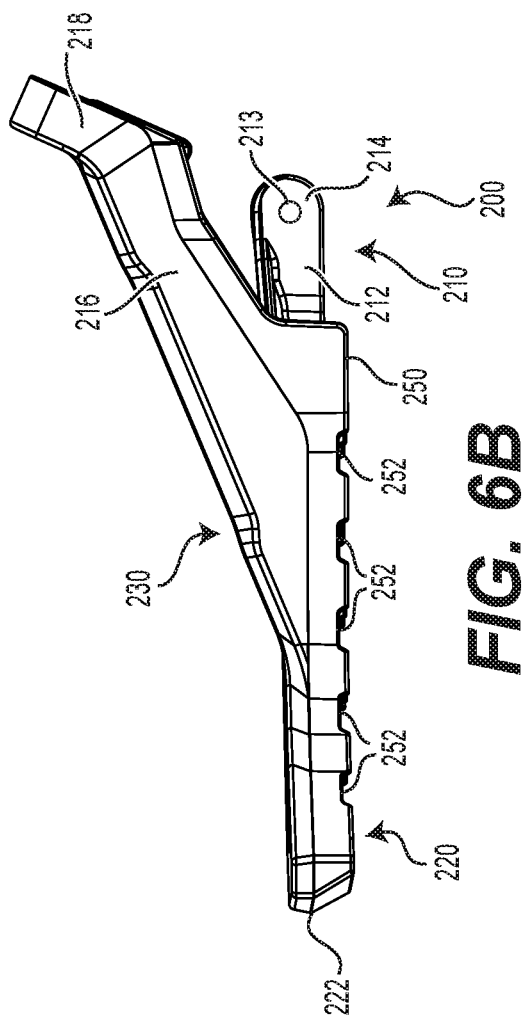
FIG. 6C is a left side elevation view of the left toe hold of FIG. 6A.

The central portion 230 extends laterally outwardly and downwardly to the outer portion 220. The central portion 230 and the outer portion 220 are in the form of a cantilever freely suspended above the left footrest 64 as mentioned above. The central portion 230 has a generally trapezoidal shape as viewed from above (FIG. 6A). The length (measured in the longitudinal direction) of the central portion 230 is generally decreasing from the portion connected to the mounting arms 212, 216 to the portion connected to the outer portion 220. It is contemplated that the central portion 230 could be configured differently than as shown herein.

The cantilevered outer portion 220 extends generally horizontally. The outer portion 220 extends laterally outwardly and rearwardly from the central portion 230 to an outer end 222. Although not shown for the toe hold 200, the triangular portion of the front outer surface 150 of the left side panel 100 is disposed longitudinally forward of the outer portion 220, as can be seen for the toe hold 65 in FIG. 2B. Although not shown for the toe hold 200, the outer end 222 of the left toe hold 200 extends further laterally outward than the outer edge of the left footrest 64 as can be seen for the left toe hold 65 in FIG. 2B to 2D.

The outer portion 220 of the left toe hold 200 is spaced from the left footrest 64 such that the front portion of the driver's left foot can be placed between the left footrest 64 and the left toe hold 200 and freely moved from the space therebetween in a laterally outward direction for disengaging the left foot from the snowmobile 10.

The left toe hold 200 has a lower surface 250, which has grooves 252 formed therein in the outer portion 220 and the central portion 230. The grooves 252 of the lower surface 250 facilitate engagement of the upper surface of the front portion of the driver's foot in the event that the front portion of the driver's left foot is raised upwardly from the footrest 64. In some implementations, it is contemplated that a lower edge of the outer end 222 could be disposed vertically lower than the lower surface 250 of the outer portion 220 having the grooves 250. It is however contemplated that the lower surface 250 could be generally smooth in the central portion 230 and the inner portion 210.

The right toe hold 201 will now be discussed with reference to FIGS. 7A to 8B. As mentioned above, the right toe hold 201 is similar to the left toe hold 200, and as such the right toe hold 201 will only be discussed below with respect to differences from the left toe hold 200.

The front mounting arm 212 of the right toe hold 201 extends laterally outwardly, downwardly and slightly rearwardly from the inner end 214 to the central portion 230. The rear mounting arm 216 also extends laterally outwardly and downwardly from the inner end 218 to the central portion 230. Both the front mounting arm 212 and the rear mounting arm 216 connect via their inner ends 214, 218 to the chaincase cover 19, as will be discussed in more detail below.

The front mounting arm 212 is longitudinally spaced from the rear mounting arm 216 but aligned therewith in the vertical and lateral directions. The aperture 217 and the rear surface of the rear mounting arm 216 are disposed longitudinally forward of the rear edge of the outer end 222 as can be seen when viewed from the right side (FIG. 7D) or the top (FIG. 7B). It is contemplated that the mounting arms 212, 216 of the right toe hold 201 could be configured differently than as shown herein. For example, the rear mounting arm 216 could be disposed higher or lower than the front mounting arm 212. It is also contemplated that the inner portion 210 could have a single mounting arm or more than two mounting arms such as in the left toe hold 65 which has three mounting arms (not indicated) as can be seen in FIG. 2C.

As can be seen in FIGS. 8A and 8B, the inner ends 214, 218 of the mounting arms 212, 216 of the right toe hold 201 are connected to the chaincase cover 19 covering the reduction gear assembly 270 (shown schematically) of the snowmobile 10. The reduction gear assembly 270 includes a small sprocket 272 mounted on the countershaft 54 of the belt transmission, a large sprocket 274 mounted on the drive axle 35 (shown schematically in FIG. 1), and a chain 273 looped around the sprockets 272, 274 for driving the endless track 30. The reduction gear assembly 270 is disposed on a right side of the longitudinal centerplane 13. The small sprocket 272 of the reduction gear assembly 270 is disposed forwardly and vertically higher than the large sprocket 274.

The chaincase cover 19 has a generally oblong shape with rounded end portions 262, 264. The upper rounded end portion 262 covers the small sprocket 272 and thus has a smaller radius of curvature than the lower rounded end portion 264 disposed longitudinally forwardly thereof and covering the large sprocket 274. The right side panel 100 is disposed over the upper rounded end portion 272 as can be seen in FIG. 1. The lower rounded end portion 274 is disposed over the right side portion 18a of the tunnel 18 and vertically lower than the rear portion 100b of the right side panel 100. The chaincase cover 19 has a reinforced central portion 266 between the upper and lower rounded end portions 262, 264. Mounting brackets 268 having apertures 269 are formed along the rim 263 of the chaincase cover 19 which is connected to the tunnel right side portion 18a by bolts (not shown) inserted through the apertures 269. The reinforced portion 266 of the chaincase cover 19 extends from the rearwardly facing portion of the rim 263 to the forwardly facing portion of the rim 263 such that two of the mounting brackets 268 disposed along the rearwardly facing portion of the rim 263 and one mounting bracket 268 of the forwardly facing portion of the rim 263 are disposed in the reinforced portion 266. The reinforced portion of the chaincase cover 19 has apertures (not shown) corresponding to the apertures 213, 217 of the mounting arms 212, 216. Bolts are inserted through the aligned chaincase cover apertures (not shown) and mounting arm apertures 213, 217 to mount the right toe hold 201 to the reinforced central portion 266 of the chaincase cover 19.

Although the left toe hold 200 shown herein is generally similar to the right toehold 201, it is however contemplated that the left toe hold 200 could be different from the right toe hold 201. For example, one of the left and right toe hold 200, 201 could have a different number of mounting arms than the other one of the left and right toe hold 200, 201.

With reference to FIGS. 9A to 10D, another implementation of a left toe hold 300 and a right toe hold 301 of the snowmobile 10 will now be described in detail. The left toe hold 300 is similar to the left toe hold 200 seen in FIGS. 6A to 6D and the right toe hold 301 is similar to the right toe hold 201 seen in FIGS. 7A to 8B.

The left toe hold 300, as illustrated in FIGS. 9A to 9E, has an inner portion 310, an outer portion 320 and a central portion 330 connecting the inner portion 310 to the outer portion 320. The outer portion 320 is disposed laterally outwardly (leftwardly) of the inner portion 310 when the left toe hold 300 is mounted on the snowmobile 10. The left toe hold 300 is mounted to the snowmobile 10 by its inner portion 310. The outer portion 320 is freely suspended above the left footrest 64.

The inner portion 310 includes a front mounting arm 312 and a rear mounting arm 316. An inner end 314 of the front mounting arm 312 has an aperture 313 through which a bolt (not shown) is inserted to mount the front mounting arm 312 to the left footstop 63, as illustrated in FIG. 9E. The front mounting arm 312 extends rearwardly and laterally outwardly from the inner end 314 to the central portion 330.

An inner end 318 of the rear mounting arm 316 has another aperture 317 through which a bolt (not shown) is inserted to mount the rear mounting arm 316 to the left side portion 18a of the tunnel 18. As can be seen in FIGS. 9A, 9D, and 9E, the inner end 318 is at an angle with respect to vertical such that it can be bolted to an angled portion at a top side of the left side portion of the tunnel 18a. The rear mounting arm 316 has an additional section 360 which defines an aperture 361 through which a second bolt (not shown) is inserted when connecting the rear mounting arm 312 to the tunnel 18. The rear mounting arm 316 extends downwardly and laterally outwardly from the inner end 318 thereof to the central portion 330. The front mounting arm 312 is thus disposed lower than the rear mounting arm 316. It is however contemplated that the front and rear mounting arms 312, 316 could be configured differently than as shown herein. For example, the rear mounting arm 316 could be disposed lower than the front mounting arm 312.

The central portion 330 extends laterally outwardly and downwardly to the outer portion 320. The central portion 330 and the outer portion 320 are in the form of a cantilever freely suspended above the left footrest 64 as mentioned above. The central portion 330 has a generally trapezoidal shape as viewed from above (FIG. 9B). The length (measured in the longitudinal direction) of the central portion 330 is generally decreasing from the portion connected to the mounting arms 312, 316 to the portion connected to the outer portion 320. It is contemplated that the central portion 330 could be configured differently than as shown herein.

The cantilevered outer portion 320 extends generally horizontally. The outer portion 320 extends laterally outwardly from the central portion 330 to an outer end 322. A rear edge of the outer end 322 is generally longitudinally aligned with the aperture 317 of the rear mounting arm 316 as can be seen when viewed from the top (FIG. 9B) or left side (FIG. 9C).

The outer portion 320 of the left toe hold 300 is vertically spaced from the left footrest 64 such that the front portion of the driver's left foot can be placed between the left footrest 64 and the left toe hold 300 and freely moved from the space therebetween in a laterally outward direction for disengaging the left foot from the snowmobile 10.

The left toe hold 300 has a lower surface 350, which has grooves 352 formed therein in the outer portion 320 and the central portion 330. The grooves 352 of the lower surface 350 facilitate engagement of the upper surface of the front portion of the driver's foot in the event that the front portion of the driver's left foot is raised upwardly from the footrest 64. A lower edge of the outer end 322 is disposed vertically lower than the lower surface 350 of the outer portion 320 having the grooves 352 as can be seen when viewed from the rear (FIG. 9D).

The right toe hold 301 will now be discussed with reference to FIGS. 10A to 10D. As mentioned above, the right toe hold 301 retains features similar to those of the left toe hold 300, and as such the right toe hold 301 will only be discussed below with respect to differences from the left toe hold 300.

The right toe hold 301 has a mounting arm 340 with a front inner end 342 and a rear inner end 344. The front inner end 342 has an aperture 341 and the rear inner end 344 has an aperture 343, through which bolts (not shown) are inserted to mount the mounting arm 340 to the chaincase cover 19. The mounting arm 340 extends laterally downwardly from the inner ends 342 and 344 to the central portion 330. At the central portion 330, the outer portion 320 extends laterally away from the mounting arm 340.

It is contemplated that the mounting arm 340 of the right toe hold 301 could be configured differently than as shown herein. For example, the rear inner end 344 could be disposed higher than or vertically aligned with the front inner end 342. It is also contemplated that the inner portion 310 could have two or more mounting arms such as in the left toe hold 300. It is also contemplated that the mounting arm 340 could have a single end portion or more than two end portions through which bolts could be passed for securing the right toe hold 301 to the frame 18.

With reference to FIGS. 11A to 14, another implementation of a left toe hold 400 and a right toe hold 401 of the snowmobile 10 will now be described in detail.

The left toe hold 400, as illustrated in FIGS. 11A to 12C, has an inner portion 410, an outer portion 420 and a central portion 430 connecting the inner portion 410 to the outer portion 420. The outer portion 420 is disposed laterally outwardly (leftwardly) of the inner portion 410 when the left toe hold 400 is mounted on the snowmobile 10. The outer portion 420 is freely suspended above the left footrest 64.

The inner portion 410 is movably connected to a left base 480. The left base 480 is bolted to the left side portion 18A of the tunnel 18 by two bolts 482. The inner portion 410 defines a channel 412 through which a bolt 414 connects the left toe hold 400 to the left base 480. In some implementations, the left base 480 could be integral with the left side portion 18A of the tunnel 18, and the left toe hold 400 could be movably connected to the tunnel 18.

The left base 480 has a channel 484 which allows the user to adjust a longitudinal position of the left toe hold 400. A nut (not shown) inside the channel 484 receives the bolt 414, holding the left toe hold 400 to the left base 480. By loosening the bolt 414 from the nut, the user can translate the left toe hold 400 in either a forward or rearward direction.

The left toe hold 400 includes a longitudinal alignment aid 415 on an inner edge 417 of the inner portion 410. The left base 480 has four corresponding alignment notches 490, identified as A through D. By aligning the aid 415 with one of the alignment notches 490, the user adjusts the longitudinal position of the left toe hold 400 to one of four longitudinal positions (A, B, C, or D). Once the left toe hold 400 is properly aligned, the bolt 414 can be tightened into the nut and as such the longitudinal position is fixed.

Figure 12A:
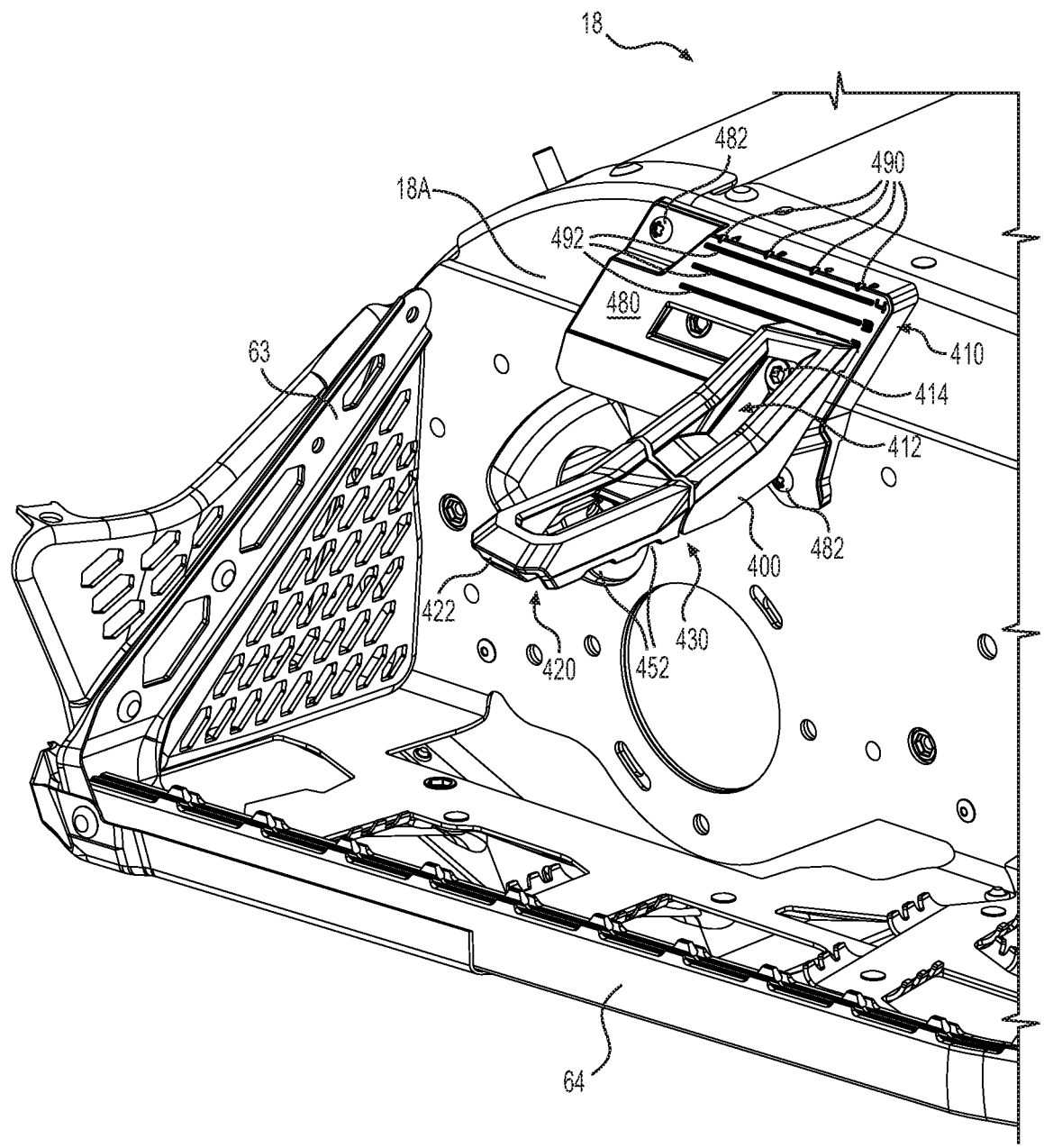
FIG. 12A is a perspective view, taken from a top, rear and left side of the left toe hold and the left base of FIG. 11A as installed on the tunnel of FIG. 2B.
Figure 12B:
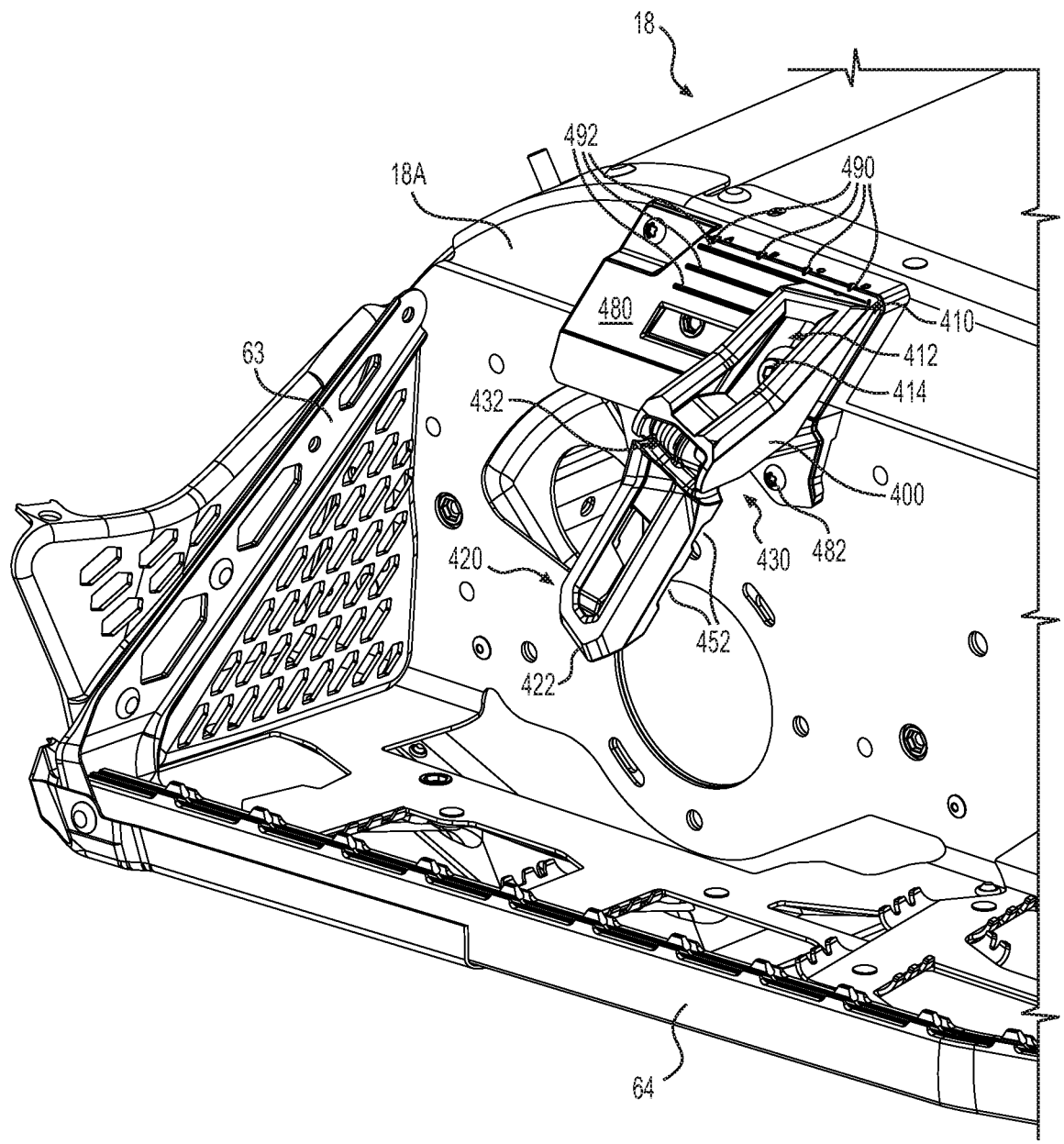
FIG. 12B is the left toe hold, left base, and tunnel of FIG. 12A, with the outer portion being in the lowered position.
Figure 12C:
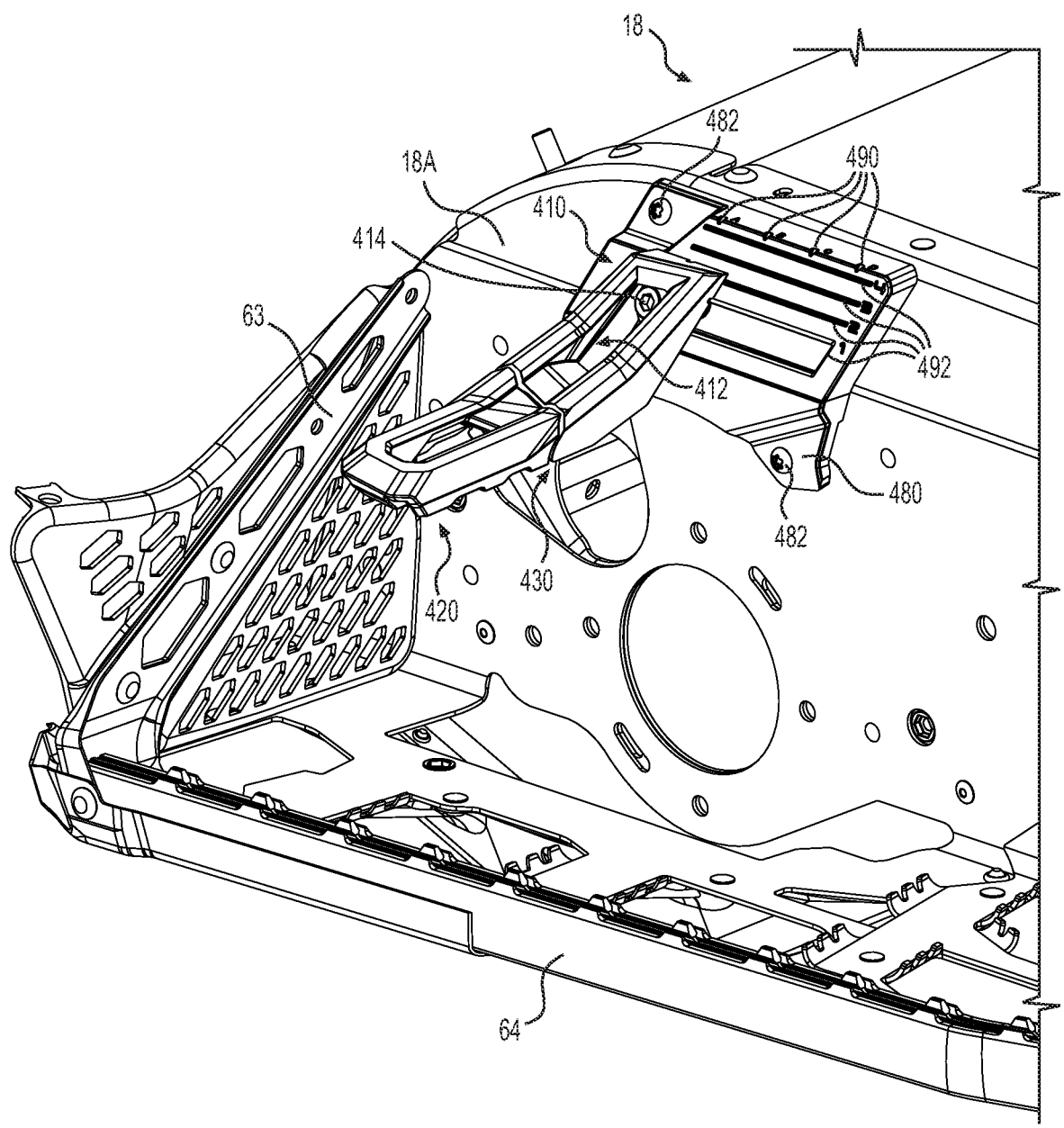
FIG. 12C is the left toe hold, left base, and tunnel of FIG. 12A, with the left toe hold translated to a forward position.

For example, in FIG. 12A, the left toe hold 400 is shown in a maximum rearward position, which is identified by alignment notch 490 D. In FIG. 12C, the left toe hold 400 is in a maximum forward position, where the alignment aid 415 is aligned with the alignment notch 490 A.

In the present implementation, the left toe hold 400 may be positioned at any one of four longitudinal positions. It is contemplated, however, that the left toe hold 400 could have more or less longitudinal positions. It is also contemplated that the left toe hold 400 could have a range of placement along the left base 480, instead of having discrete longitudinal positions. It is contemplated that other implementations could include a different mechanism for translating and fixing the left toe hold 400 with respect to the left base 480. It is also contemplated that the left toe hold 400 could be immovably mounted to the left base 480. It is also contemplated that the toe holds 400, 401 could be adjustably mounted directly to the tunnel 18 and the tunnel 18 could include the details necessary for making the toe holds 400, 401 adjustable.

The left toe hold 400 is also translatable in a generally vertical direction with respect to the left base 480. Similar to adjusting the longitudinal position as described above, the bolt 414 is used to adjust and fix a vertical position of the left toe hold 400. Upon loosening the bolt 414, the user can move the left toe hold 400 in a generally upward or downward direction, wherein the bolt 414 thus slides along the channel 412 in the inner portion 410.

Figure 11A:
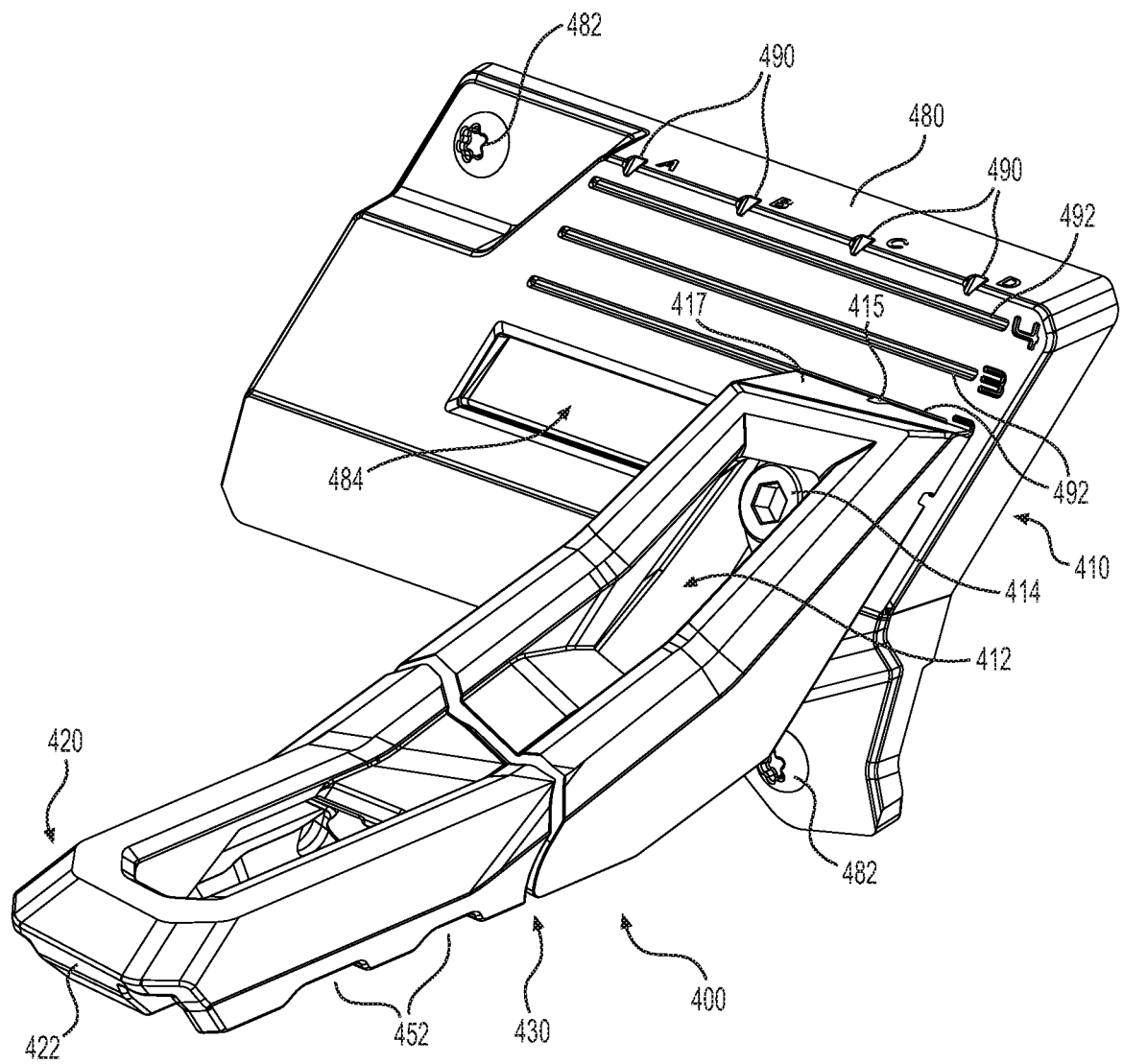
FIG. 11A is a perspective view, taken from a top, rear and left side of another alternative implementation of a left toe hold and a left base of the snowmobile of FIG. 1, with an outer portion of the left toe hold being in an extended position.
Figure 11B:
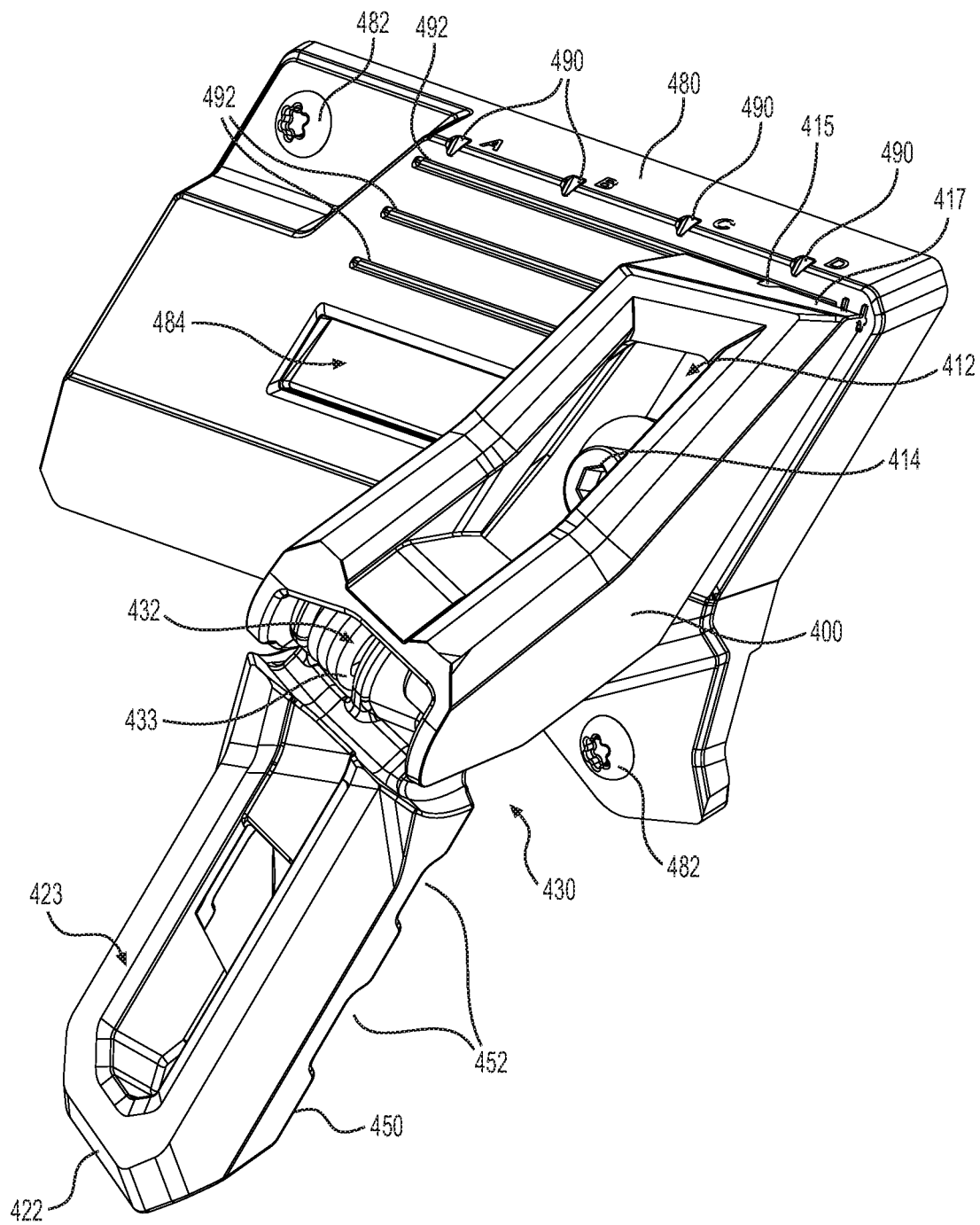
FIG. 11B is the left toe hold and the left base of FIG. 11A, with the outer portion being in a lowered position.

The left base 480 includes three vertical alignment grooves 492 to aid in the alignment of the vertical position of the left toe hold 400. By aligning the inner edge 417 of the inner portion with one of the grooves 492, the user selects the vertical position of the left toe hold 400. As before, tightening the bolt 414 then fixes the left toe hold 400 at the selected vertical position. Two example vertical positions are illustrated in FIGS. 11A and 11B. In FIG. 11A, the inner edge 417 is aligned with the groove 492 identified as groove 2. In FIG. 11B, the inner edge 417 is aligned with a top-most groove 492, identified as Line 4.

In the present implementation, the left toe hold 400 may be positioned at any one of four vertical positions. It is contemplated, however, that the left toe hold 400 could have more or less vertical positions. Although the left toe hold 400 has a range of vertical placement with respect to the left base 480 and is not restricted to the vertical positions marked by the alignment grooves 492, It is contemplated that the left toe hold 400 could be restricted to discrete vertical positions. It is contemplated that other implementations could include a different mechanism for vertically translating and fixing the left toe hold 400.

The central portion 430 extends laterally outwardly and downwardly to the outer portion 420. The central portion 430 and the outer portion 420 are in the form of a cantilever freely suspended above the left footrest 64 as mentioned above. The central portion 430 includes a hinge 432 rotatably connecting the outer portion 420 to the inner portion

410. The hinge 432 includes a spring 433, which biases the outer portion 420 toward an extended position, illustrated in FIG. 11A.

The hinge 432 and its spring 433 allows the outer portion 420 of the left toe hold 400 to be rotated to a lowered position. When the user is mounting the vehicle, for example, the user's foot may descend onto a top side 423 of the outer portion 420. The outer portion 420 is thus pushed to the lowered position, illustrated in FIG. 11B, allowing the user's foot to continue to the footrest 64 without overly impeding the user's foot. When the user's foot is no longer applying a force to the outer portion 420, the spring 433 biases the outer portion 420 back to the extended position. As seen in FIG. 12A, the hinge 432 and the spring 433 are situated laterally between an outer edge of the footrest 64 and the left side portion 18A of the tunnel 18.

In some implementations, more or less of the left toe hold 400 may be rotatable. It is also contemplated that the central portion 430 could be configured differently than as shown herein. For example, the hinge 432 and spring 433 could be replaced with another mechanism.

In the extended position, the cantilevered outer portion 420 extends generally horizontally. The outer portion 420 extends laterally outwardly from the central portion 430 to an outer end 422. The outer portion 420 of the left toe hold 400 is vertically spaced from the left footrest 64 such that the front portion of the driver's left foot can be placed between the left footrest 64 and the left toe hold 400 and freely moved from the space therebetween in a laterally outward direction for disengaging the left foot from the snowmobile 10 as described above with the toe holds 65, etc.

The left toe hold 400 has a lower surface 450, which has grooves 452 formed therein in the outer portion 420. The grooves 452 of the lower surface 450 facilitate engagement of the upper surface of the front portion of the driver's foot in the event that the front portion of the driver's left foot is raised upwardly from the footrest 64.

Figure 13A:
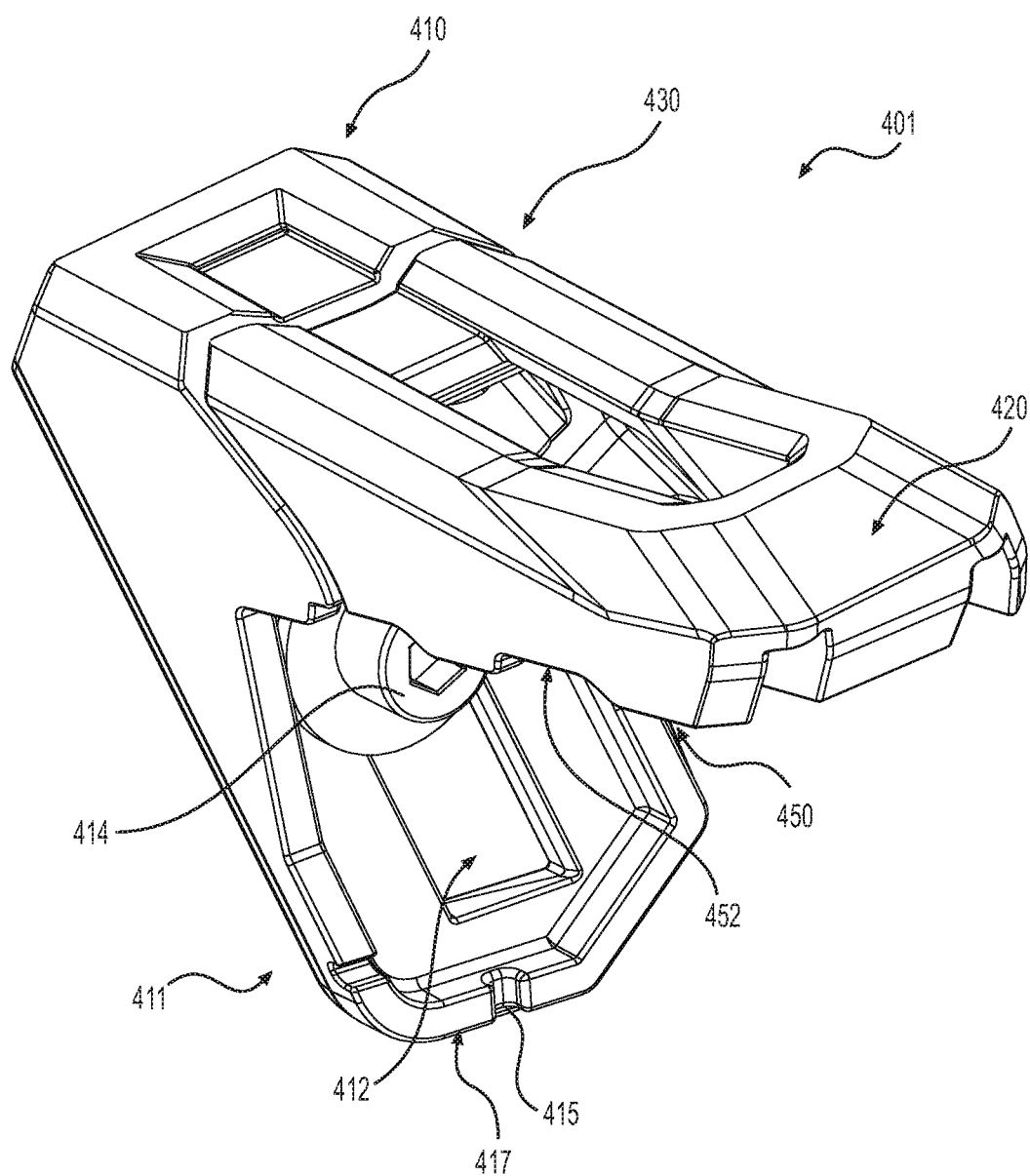
FIG. 13A is a perspective view, taken from a top, rear, and right side of another alternative implementation of a right toe hold of the snowmobile of FIG. 1, with an outer portion of the right toe hold being in an extended position.
Figure 13B:
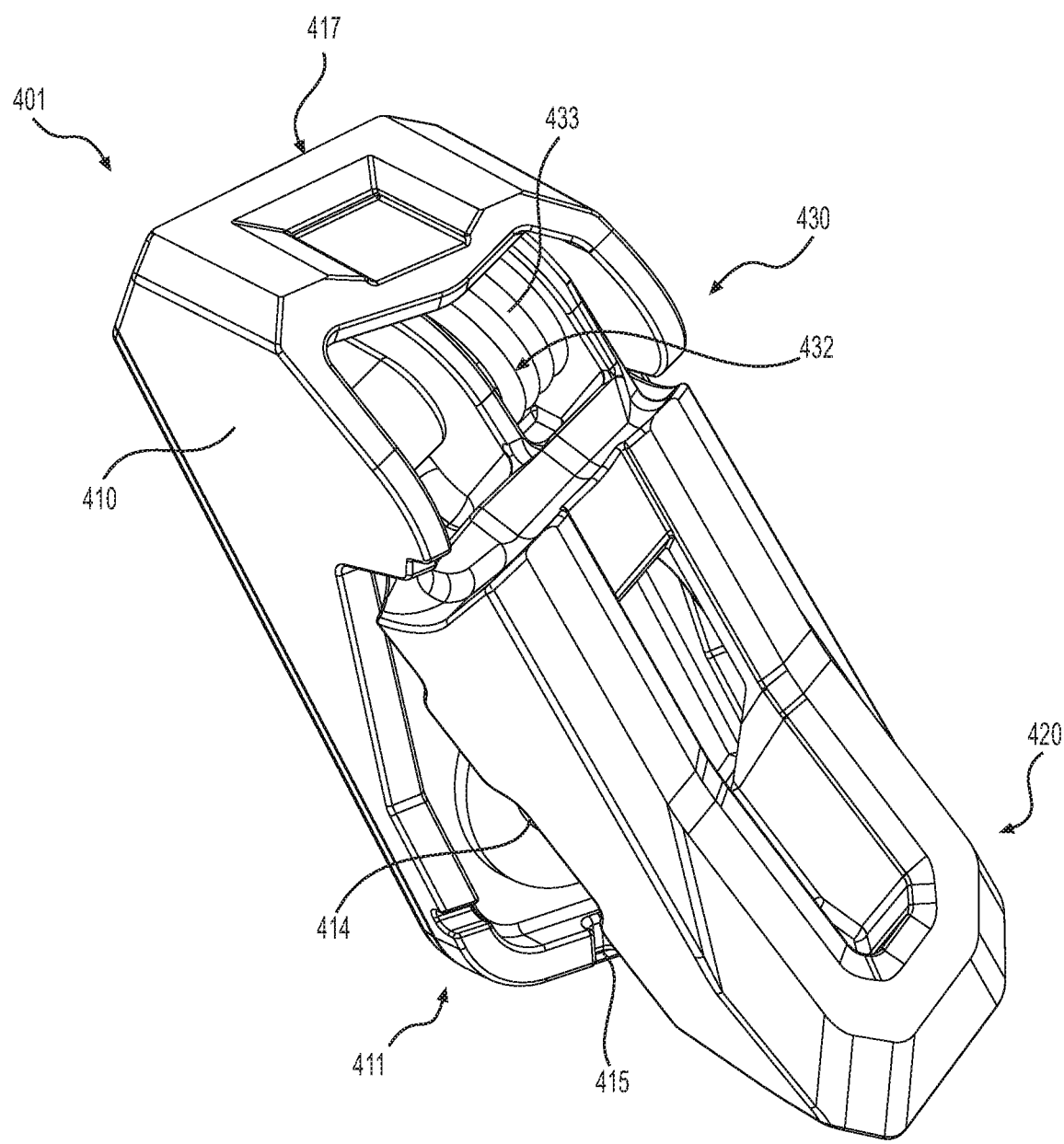
FIG. 13B is the right toe hold of FIG. 13A, with the outer portion being in a lowered position.
Figure 14:
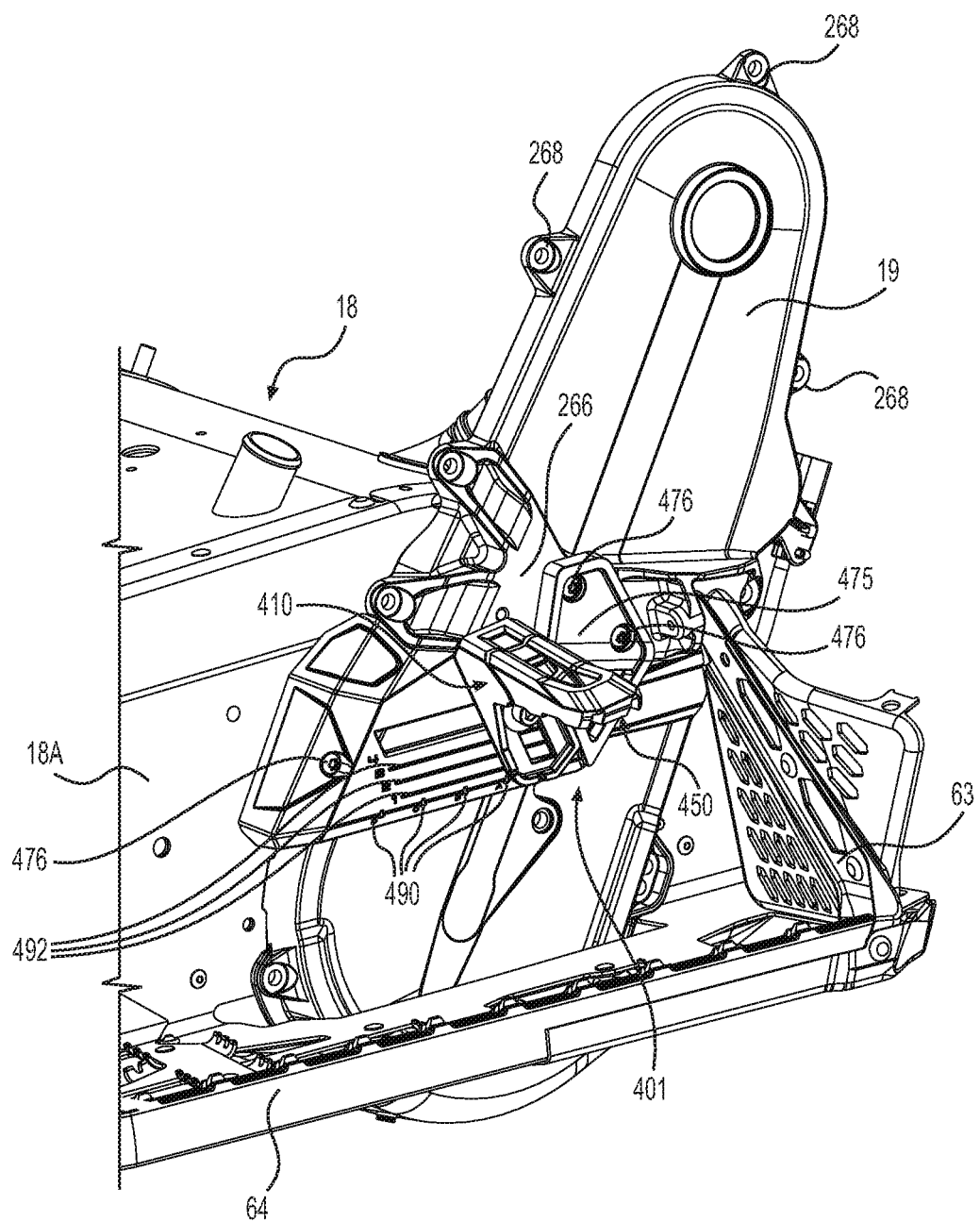
FIG. 14 is a perspective view, taken from a top, rear and right side of the right toe hold of FIG. 13A and a right base mounted to the chaincase cover of the snowmobile of FIG. 1.

The right toe hold 401 will now be discussed with reference to FIGS. 13A to 14. As mentioned above, the right toe hold 401 retains features similar to those of the left toe hold 400, and as such the right toe hold 401 will only be discussed below with respect to differences from the left toe hold 400.

The right toe hold 401 has an inner portion 410 which extends partially below the outer portion 420. The channel 412 is found in a lower end 411 of the inner portion 410, generally below the outer portion 420. As with the left toe hold 400, the outer portion 420 of the right toe hold 401 is connected to the inner portion 410 by the hinge 432 in the central portion 430.

A right base 475 is bolted to the chaincase cover 19 by three bolts 476. The inner portion 410 is movably connected to the right base 475. The right toe hold 401 has five longitudinal positions, identified by the alignment notches 490. There are four vertical positions labelled for the right toe hold 401, as identified by four vertical alignment grooves 492. The vertical position of the right toe hold 401 is not restricted to these positions; the alignment grooves 492 simply provide several possibilities.

The vertical and longitudinal alignment positions of the right toe hold 401, identified by the alignment notches 490 and the grooves 492, are a mirror image of the alignment positions of the left toe hold 400. As such, when the user aligns both toe holds 400, 401 with, for example, position A-1, the bottom surface 450 of the toe holds 400, 401 are at the same height and distance from the user. Similarly, placing both toe holds 400, 401 at position C4 will result in the bottom surfaces 450 being in mirror image locations with respect to the snowmobile. These are just some examples of possible arrangements of the toe holds 400, 401; it is contemplated that the user may position the toe holds 400, 401 in any relative arrangement. It is also contemplated that the alignment grooves 492 and the alignment notches 490 of the left toe hold 400 may not be mirror images of those of the right toe hold 401, while the alignment positions thereof are mirror images of one another.

It is contemplated that the right toe hold 401 could have more or less vertical and longitudinal positions. It is also contemplated that the right toe hold 401 could have discrete vertical positions, instead of having a range of possible positions.

It is contemplated that other implementations could include a different mechanism for vertically translating and fixing the right toe hold 401.

With reference now to FIGS. 4A to 4E, the positioning of the driver's feet with respect to the toe holds 200 will be described. Although the description below refers to the toe holds 200, the description also applies to the implementations of the toe holds 65, 300, and 400.

When the driver is seated in an upright position as shown in FIG. 4A, the driver's left leg is intended to be disposed in the rear left leg area as mentioned above, and the driver's left foot is intended to be placed on the left footrest 64 so as to be pointing forwardly with the front portion of the left foot being generally longitudinally aligned with the heel. The left foot is disposed laterally inwardly of the outer edge of the left footrest 64. The front portion of the left foot is disposed on the left footrest 64 below the central 230 and outer portions 220 of left toe hold 200. The outer end 222 of the left toe hold 200 is disposed laterally outwardly of the left foot. The driver's right leg is intended to be disposed in the rear right leg area 102 and the right foot is disposed on the right footrest 64 and with respect to the right toe hold 201 in a position that is generally a mirror image of the positioning of the left foot described above.

When the driver leans to the right side of the snowmobile 10 while making a right turn, the driver's right leg is intended to move from the rear right leg area 102 to the front right leg area 104 as mentioned above. With reference to FIG. 4D, in order to position the right leg in the front right leg area 104, the driver may move the left foot to a position pointing laterally outwardly, i.e. the front portion of the left foot is disposed laterally outwardly of the heel thereof. The front portion of the driver's left foot is disposed closer to the outer end 222 in the rightward leaning position of FIGS. 4B and 4D than in the upright position of FIG. 4A. In some situations, the front portion of the left foot is also raised from the left footrest 64 while the left heel remains supported by the left footrest 64. The lower surface 250 of the outer portion 220 having the grooves 252 engages the upper surface of the driver's left boot if the left foot is raised from the left footrest 64 thus providing stability to the driver leaning rightwardly. The rearwardly extending shape of the outer portion 220 enables engagement of a greater portion of the upper surface of the left boot than if outer portion 220 extended only laterally and not rearwardly. The rearwardly extending shape of the outer portion 222 thus provides stability while allowing the pivoting or turning outward of the front portion of the left foot with respect to the heel thereof.

In some situations, such as when making an aggressive right turn as shown in FIGS. 4C and 4E, the driver's left foot could be pivoted even further laterally outwardly with respect to the heel such that a portion of the front left foot is disposed between the outer end 222 of the left toe hold and the outer edge of the left footrest 64.

It should be understood that the positioning of the left and right feet while leaning leftwardly is intended to be a mirror image respectively of that described above for the right foot and the left foot in the rightward leaning position.

Modifications and improvements to the above-described implementations of the present may become apparent to those skilled in the art. The foregoing description is intended to be exemplary rather than limiting. The scope of the present is therefore intended to be limited solely by the scope of the appended claims.

What is claimed is:

1. A snowmobile comprising:
   a frame defining a longitudinal centerplane of the snowmobile;
   a motor operatively connected to the frame;
   an endless track operatively connected to the motor and the frame;
   a straddle seat connected to the frame and configured to accommodate a driver;
   a left footrest connected to the frame and extending laterally outwardly therefrom, the left footrest extending generally horizontally and being disposed on a left side of the snowmobile vertically lower than the straddle seat for supporting a left foot of the driver;
   a right footrest connected to the frame and extending laterally outwardly therefrom, the right footrest extending generally horizontally and being disposed on a right side of the snowmobile vertically lower than the straddle seat for supporting a right foot of the driver;
   a left toe hold disposed above the left footrest, a portion of the left footrest extending under the left toe hold, the left toe hold being supported at an inner portion thereof and extending laterally outwardly therefrom to an outer portion thereof, all portions of the left toe hold disposed outward of the inner portion being freely suspended; and
   a right toe hold disposed above the right footrest, a portion of the right footrest extending under the right toe hold, the right toe hold being supported at an inner portion thereof and extending laterally outwardly therefrom to an outer portion thereof, all portions of the right toe hold disposed outward of the inner portion being freely suspended.

2. The snowmobile of claim 1, wherein:
   the left toe hold is configured to accommodate the driver's left foot selectively disposed in a first left foot position and a second left foot position and moveable therebetween, a front portion of the left foot being disposed between an outer end of the outer portion of the left toe hold and the left footrest in the second left foot position, the front portion of the left foot being disposed further laterally outwardly in the second left foot position than in the first left foot position; and
   the right toe hold is configured to accommodate the driver's right foot selectively disposed in a first right foot position and a second right foot position and moveable therebetween, a front portion of the right foot being disposed between an outer end of the outer portion of the right toe hold and the right footrest in the second right foot position, the front portion of the right foot being thereby disposed further laterally outwardly in the second right foot position than in the first right foot position.

3. The snowmobile of claim 1, wherein the outer portion of each of the left and right toe holds has a lower surface facing towards the corresponding one of the left and right footrests, the lower surface having at least one groove.

4. The snowmobile of claim 1, wherein the outer portion of each of the left and right toe holds extends rearwardly in a laterally outwardly direction.

5. The snowmobile of claim 1, wherein:
   an outer end of the outer portion of the left toe hold extends laterally outwardly of an outer edge of the portion of the left footrest disposed below the left toe hold; and
   an outer end of the outer portion of the right toe hold extends laterally outwardly of an outer edge of the portion of the right footrest disposed below the right toe hold.

6. The snowmobile of claim 1, wherein each of the left and right footrests is a footboard.

7. The snowmobile of claim 1, wherein the inner portion of at least one of the left and right toe holds comprises a first mounting portion and a second mounting portion.

8. The snowmobile of claim 7, wherein the first mounting portion is disposed longitudinally forward of the second mounting portion.

9. The snowmobile of claim 1, further comprising:
   a reduction gear assembly operatively connecting the motor to the endless track, the reduction gear assembly being disposed on one of a right side and a left side of the longitudinal centerplane; and
   a chaincase cover disposed over the reduction gear and connected to the frame,
      the inner portion of one of the left toe hold and the right toe hold being mounted to the chaincase cover, and
      the inner portion of an other one of the left toe hold and right toe hold being mounted to the frame.

10. The snowmobile of claim 9, wherein:
    the reduction gear assembly is disposed on the right side of the longitudinal centerplane;
    the inner portion of the left toe hold is mounted to the frame; and
    the inner portion of the right toe hold is mounted to the chaincase cover.

11. The snowmobile of claim 1, further comprising:
    a drive axle operatively connected to the motor and the endless track for driving the endless track, the drive axle extending laterally and horizontally and defining a drive axle axis, the left and right toe holds being disposed longitudinally rearwardly of the drive axle axis.

12. The snowmobile of claim 1, further comprising:
    a left side panel disposed on a left side of the snowmobile; and
    a right side panel disposed on a right side of the snowmobile,
    each of the left and right side panels being connected to the frame and disposed at least in part longitudinally forward of and vertically lower than the straddle seat, wherein:
       the left toe hold is housed at least in part in a left foot space defined by the left side panel and the left footrest; and
       the right toe hold is housed at least in part in a right foot space defined by the right side panel and the right footrest.

13. The snowmobile of claim 1, further comprising:
    a left side panel disposed on a left side of the snowmobile; and
    a right side panel disposed on a right side of the snowmobile, each of the left and right side panels being connected to the frame and disposed at least in part longitudinally forward of and vertically lower than the straddle seat, the left side panel extending above the left toe hold and having an outer surface defining a left leg area for accommodating a portion of a left leg of the driver; and the right side panel extending above the right toe hold and having an outer surface defining a right leg area for accommodating a portion of a right leg of the driver.

14. The snowmobile of claim 13, wherein when viewed from above:
a rear edge of the left side panel disposed above the left footrest is disposed rearwardly of the inner end of the left toe hold and forwardly of the outer end of the left toe hold; and
the rear edge of the right side panel disposed above the right footrest is disposed rearwardly of the inner end of the right toe hold and forwardly of the outer end of the right toe hold.

15. The snowmobile of claim 13, wherein:
the left leg area is a rear left leg area selectively accommodating the portion of the left leg of the driver in a rear left leg position; and
the right leg area is a rear right leg area selectively accommodating the portion of the right leg of the driver in a rear right leg position, and
the snowmobile further comprises:
a front left leg area defined by the left side panel and disposed longitudinally forward of the rear left leg area, the front left leg area being configured to selectively accommodate the portion of the left leg of the driver in a front left leg position when the driver is leaning leftwardly; and
a front right leg area defined by the right side panel and disposed longitudinally forward of the rear right leg area, the front right leg area being configured to selectively accommodate the portion of the right leg of the driver in a front right leg position when the driver is leaning rightwardly.

16. The snowmobile of claim 15, wherein:
the left toe hold is configured to accommodate the driver's left foot selectively disposed in a first left foot position and a second left foot position and moveable therebetween, a front portion of the left foot being disposed between an outer end of the outer portion of the left toe hold and the left footrest in the second left foot position, the front portion of the left foot being disposed further laterally outwardly in the second left foot position than in the first left foot position, the left toe hold being configured to accommodate the driver's left foot in the second left foot position when the portion of the driver's right leg is in the front right leg area; and
the right toe hold is configured to accommodate the driver's right foot selectively disposed in a first right foot position and a second right foot position and moveable therebetween, a front portion of the right foot being disposed between an outer end of the outer portion of the right toe hold and the right footrest in the second right foot position, the front portion of the right foot being thereby disposed further laterally outwardly in the second right foot position than in the first right foot position, the right toe hold being configured to accommodate the driver's right foot in the second right foot position when the portion of the driver's left leg is in the front left leg area.

17. The snowmobile of claim 16, wherein:
the left toe hold is configured to accommodate the driver's left foot in the first left foot position when the portion of the driver's right leg is in the rear right leg area; and
the right toe hold is configured to accommodate the driver's right foot in the first right foot position when the portion of the driver's left leg is in the rear left leg area.

18. The snowmobile of claim 1, further comprising:
a left footstop extending upwardly above the left footrest and being disposed longitudinally forward of the left toe hold; and
a right footstop extending upwardly above the right footrest and being disposed longitudinally forward of the right toe hold.

19. The snowmobile of claim 18, wherein:
the left footstop is connected to the left footrest; and
the right footstop is connected to the right footrest.

20. The snowmobile of claim 19, wherein at least one of the right toe hold and the left toe hold is mounted at least in part to a corresponding one of the left footstop and the right footstop.

21. The snowmobile of claim 15, wherein for each of the left and right side panels:
the outer surface comprises a rear lateral surface and a front lateral surface disposed at least in part longitudinally forward of the rear lateral surface, each of the rear and front lateral surfaces extending generally laterally and vertically, and wherein:
the rear left leg area is defined at least in part by the rear lateral surface of the left side panel;
the front left leg area is defined at least in part by the front lateral surface of the left side panel;
the rear right leg area is defined at least in part by the rear lateral surface of the right side panel; and
the front leg area is defined at least in part by the front lateral surface of the left side panel.

22. The snowmobile of claim 21, wherein for each of the left and right side panels:
the front lateral surface extends laterally outwardly of the rear lateral surface.

23. The snowmobile of claim 21, wherein for each of the left and right side panels:
the outer surface further comprises a longitudinal surface extending generally longitudinally and vertically, the longitudinal surface being disposed at least in part longitudinally rearward of the front lateral surface and longitudinally forward of the rear lateral surface.

24. The snowmobile of claim 23, wherein for each of the left and right side panels:
the longitudinal surface is a front longitudinal surface and further comprising a rear longitudinal surface extending generally longitudinally and vertically, the rear longitudinal surface being disposed at least in part longitudinally rearward of the rear lateral surface.

25. The snowmobile of claim 23, wherein for each of the left and right side panels:
the outer surface further comprises a front outer surface extending laterally outwardly and forwardly from the front lateral surface.

26. The snowmobile of claim 25, wherein for each of the left and right side panels:
a portion of the front outer surface is disposed lower than the front lateral surface.

27. The snowmobile of claim 24, wherein for each of the left and right side panels:

the front outer surface is aligned in the lateral direction with the outer portion of the corresponding one of the left toe hold and the right toe hold.

28. The snowmobile of claim 1, wherein:
a front end of the left footrest is disposed longitudinally forward of the left toe hold; and
a front end of the right footrest is disposed longitudinally forward of the right toe hold.

29. The snowmobile of claim 1, wherein for each of the right and left toe holds:
a biasing element rotatably connects the outer portion to the inner portion, the biasing element biasing the outer portion toward an extended position.

30. The snowmobile of claim 29, wherein, for each of the right and left toe holds, the outer portion is connected to the inner portion by a hinge.

31. The snowmobile of claim 9, further comprising:
a right base, the right toe hold being movably connected to the right base; and
a left base, the left toe hold being movably connected to the left base,
wherein:
one of the right base and the left base is connected to the chaincase cover; and
an other of the right base and the left base is connected to the frame.

32. The snowmobile of claim 31, wherein, for each of the right and left toe holds, the toe hold is vertically translatable with respect to its corresponding base.

33. The snowmobile of claim 31, wherein, for each of the right and left toe holds, the toe hold is longitudinally translatable with respect to its corresponding base.

34. The snowmobile of claim 1, wherein, for each of the right and left toe holds, the toe hold is vertically translatable with respect to the frame.

35. The snowmobile of claim 1, wherein, for each of the right and left toe holds, the toe hold is longitudinally translatable with respect to the frame.

* * * * *